(12) United States Patent
Leem et al.

(10) Patent No.: US 12,153,191 B2
(45) Date of Patent: Nov. 26, 2024

(54) OPTICAL DEVICE AND METHOD OF MANUFACTURING THE SAME

(71) Applicant: Samsung Electronics Co., Ltd., Suwon-si (KR)

(72) Inventors: Youngchul Leem, Uiwang-si (KR); Jeongyub Lee, Yongin-si (KR); Haesung Kim, Hwaseong-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 106 days.

(21) Appl. No.: 17/726,064

(22) Filed: Apr. 21, 2022

(65) Prior Publication Data
US 2023/0144948 A1 May 11, 2023

(30) Foreign Application Priority Data
Nov. 5, 2021 (KR) .................. 10-2021-0151669

(51) Int. Cl.
*G02B 1/00* (2006.01)

(52) U.S. Cl.
CPC .................................. *G02B 1/005* (2013.01)

(58) Field of Classification Search
CPC .......... G02B 1/005; G02B 1/002; G02B 1/02; G02B 5/1809; G02B 5/1847; G02B 5/3083; G02B 2207/101; G02B 3/0043
See application file for complete search history.

(56) References Cited

U.S. PATENT DOCUMENTS

| | | | |
|---|---|---|---|
| 2018/0039102 A1* | 2/2018 | Baik | G06F 30/17 |
| 2018/0224574 A1* | 8/2018 | Lee | G02B 1/002 |
| 2019/0044003 A1* | 2/2019 | Heck | G02B 1/002 |
| 2019/0086579 A1* | 3/2019 | Kim | G02B 27/4211 |
| 2020/0225386 A1 | 7/2020 | Tsai et al. | |
| 2021/0088694 A1 | 3/2021 | Lee et al. | |
| 2021/0103075 A1* | 4/2021 | Park | G02B 5/126 |

FOREIGN PATENT DOCUMENTS

| | | |
|---|---|---|
| EP | 3 872 538 A2 | 9/2021 |
| JP | 2022102588 A * | 7/2022 |
| KR | 10-2018-0090613 A | 8/2018 |
| KR | 10-2021-0035554 A | 4/2021 |

(Continued)

OTHER PUBLICATIONS

Noda et al., English translation for JP-2022102588-A (Year: 2022).*

(Continued)

*Primary Examiner* — Jonathan Y Jung
(74) *Attorney, Agent, or Firm* — Harness, Dickey & Pierce, P.L.C.

(57) ABSTRACT

An optical device forms a refractive index distribution for exhibiting a certain phase delay profile with respect to light in a visible light wavelength, and includes a nanopattern layer including a crystalline compound having a refractive index greater than 3 with respect to the light in the visible light wavelength band and a height equal to or less than 2 µm. The nanopattern layer may include the crystalline compound grown according to a selective epitaxial growth method, and accordingly, may have a height beneficial for a manufacturing process. Thus, the efficiency of the optical device may be improved.

16 Claims, 23 Drawing Sheets

(56) References Cited

FOREIGN PATENT DOCUMENTS

| KR | 10-2252351 B1 | 5/2021 |
|---|---|---|
| WO | WO-2006/082467 A1 | 8/2006 |
| WO | WO-2020/201111 A1 | 10/2020 |

OTHER PUBLICATIONS

Kevin P. Bassett et al, "Evolution of GaAs nanowire geometry in selective area epitaxy" Applied Physics Letters, No. 106, pp. 133102-133102-5, (2015).
"Metamaterial devices market 'to exceed $10BN by 2030" https://optics.org/news/10/8/32 Business News, pp. 1-3, (2019).
Francesco Aieta et al, "Aberration-Free Ultrathin Flat Lenses and Axicons at Telecom Wavelengths Based on Plasmonic Metasurfaces," Nano Letters, 12, 9, 4932-4936 (2012).
Joon-Suh Park et al, "All-Glass, Large Metalens at Visible Wavelength Using Deep-Ultraviolet Projection Lithography" Nano Letters, No. 19, pp. 8673-8682 (2019).
Amir Arbabi et al, "Subwavelength-thick lenses with high numerical apertures and large efficiency based on high-contrast transmit arrays" Nature Communications, vol. 6, Article No. 7069, pp. 1-6 (2015).
Michel Khoury et al, "Evolution and prevention of meltback etching: Case study of semipolar GaN growth on patterned silicon substrates," Journal of Applied Physics, No. 122, pp. 105108-105108-7 (2017).
Katherina Schneider, et al. "Gallium Phosphide-on-Silicon Dioxide Photonic Devices," Journal of Lightwave Technology, vol. 36, No. 14, pp. 2994-3002 (2018).
Extended European Search Report dated Nov. 28, 2022 issued in European Patent Application No. 22176313.9-1020.

* cited by examiner

OPTICAL DEVICE AND METHOD OF MANUFACTURING THE SAME

CROSS-REFERENCE TO RELATED APPLICATION

This application is based on and claims priority under 35 U.S.C. § 119 to Korean Patent Application No. 10-2021-0151669, filed on Nov. 5, 2021, in the Korean Intellectual Property Office, the disclosure of which is incorporated by reference herein in its entirety.

BACKGROUND

Some example embodiments relate to an optical device and/or a method of manufacturing the same.

A planar diffraction device having a meta-structure may exhibit various optical effects that are not achieved by existing refraction devices. Thus, a thin optical system may be implemented by using such a planar diffraction device, and therefore, interest in such planar diffraction devices for use in various fields has increased.

The meta-structure may have a nanoscale so that a value less than a wavelength of incident light is applied to a shape, a cycle, and/or the like. Alternatively or additionally, the nanostructure is designed to exhibit a refractive index distribution satisfying a phase delay profile set for each desired position to thereby achieve desired optical performances.

To form this type of meta-structure, a material having a high refractive index and a low extinction coefficient with respect to light in a desired wavelength band is preferred. When a refractive index is not sufficiently secured, a nanostructure having a high aspect ratio corresponding to height of at least several microns is required or used, and in this case, a manufacturing process becomes increasingly difficult, and furthermore, a shadowing effect may cause a decrease in the efficiency of a device. Alternatively or additionally, a plurality of defects may occur due to plasma damage in a process of manufacturing the nanostructure from a material having a high refractive index.

SUMMARY

Provided is an optical device which includes a material with a high refractive index and is manufactured through an easy manufacturing process.

Alternatively or additionally, provided is a method of manufacturing the optical device with reduced defects in the manufacturing process.

Additional aspects will be set forth in part in the description which follows and, in part, will be apparent from the description, or may be learned by practice of various example embodiments.

According to some example embodiments, an optical device includes: a substrate; and a nanopattern layer on the substrate and configured to form a refraction index distribution to exhibit a certain phase delay profile with respect to light in a visible light wavelength band, the nanopattern layer including a crystalline compound having a refractive index greater than 3 with reference to the light in the visible light wavelength band and having a height of 2 microns/µm or less from a surface of the substrate.

The crystalline substrate may include a Group III-V semiconductor compound that is at least one of monocrystalline or polycrystalline.

The nanopattern layer may be a selectively epitaxial layer of the crystalline compound.

The nanopattern layer may include a high refractive index pattern including the crystalline compound and a low refractive index pattern including a material having a refractive index less than that of the crystalline compound.

The low refractive index pattern may include a plurality of nanopillars, and the high refractive index pattern may include the plurality of nanopillars.

The high refractive index pattern may include a plurality of nanopillars, and the low refractive index pattern may surround the plurality of nanopillars.

The optical device may further include a residual layer on a boundary surface between the high refractive index pattern and the low refractive index pattern, the residual layer including a material different from a first material of the high refractive index pattern and a second material of the low refractive index pattern.

The low refractive index pattern may include a plurality of pillar-shaped holes.

The nanopattern layer may include a multi-layer structure.

According to some example embodiments, an electronic device includes: a lens assembly including any one optical device described above; and an image sensor configured to convert an optical image or signal formed by the nanopattern layer, into an electric signal.

According to some example embodiments, a method of manufacturing an optical device includes: forming, on a crystalline substrate, a first pattern structure including patterns, which has an aspect ratio greater than 1, and having a first height; growing a first crystalline material layer up to the first height or higher from a region without the first pattern structure in a surface region of the crystalline substrate; and bonding a support substrate on the first crystalline material layer that is grown and removing the crystalline substrate.

The forming of the first pattern structure may include: forming a dielectric layer to the first height on the crystalline substrate; forming a dry etching mask on the dielectric layer; and patterning the dielectric layer using the dry etching mask.

The crystalline substrate may include a silicon substrate, and the method may further include removing a native oxide layer on a surface of the crystalline substrate.

A wet etching method may be used in the removing of the native oxide layer.

The forming of the first pattern structure may further include, before forming the dry etching mask, forming a first wet etching protective layer on the dielectric layer.

The method may further include, after the forming of the first pattern structure and before growing the first crystalline structure, forming a second wet etching protective layer covering a top surface of the crystalline substrate and a top surface of and side surfaces of the first pattern structure.

The forming of the first pattern structure may include: forming a dry etching mask on the crystalline substrate; and patterning the crystalline substrate into a pattern having a depth equal to the first height by using the dry etching mask.

The crystalline substrate may include a silicon substrate, and the method may further include removing a native oxide layer on an etched bottom surface of the crystalline.

A wet etching method may be used in the removing of the native oxide layer.

The forming of the first pattern structure may further include, before the forming of the dry etching mask, forming a first wet etching protective layer on the crystalline substrate.

The method may further include, after the forming of the first pattern structure and before the growing of the first crystalline material layer, forming a second wet etching protective layer covering a bottom surface of the crystalline substrate and a top surface and side surfaces of the first pattern structure.

The first crystalline material layer may include a Group III-V semiconductor compound that is monocrystalline or polycrystalline.

The method may further include, after the growing of the first crystalline material layer, planarizing a height of the first crystalline material layer that is grown.

The method may further include, after the growing of the first crystalline material layer: forming a second pattern structure on the first crystalline material layer; and growing a second crystalline material layer from a region without the second pattern structure in a surface area of the first crystalline material.

According to some example embodiments, an optical device may include a plurality of nanopillars on a substrate, the plurality of nanopillars arranged such that the optical device has a refractive index distribution that exhibits a phase delay profile with respect to light in the visible spectrum. The plurality of nanopillars may be surrounded by a crystalline compound having a refractive index greater than 3 with reference to the light in the visible spectrum and having a height of 2 microns or less from a surface of the substrate.

At least one of the plurality of nanopillars may have a cylindrical shape.

A diameter of at least one of the plurality of nanopillars may be between about 10 nm to about 500 nm.

The plurality of nanopillars may at least partially surrounded by a selective epitaxial layer.

The plurality of nanopillars may have an aspect ratio greater than one.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
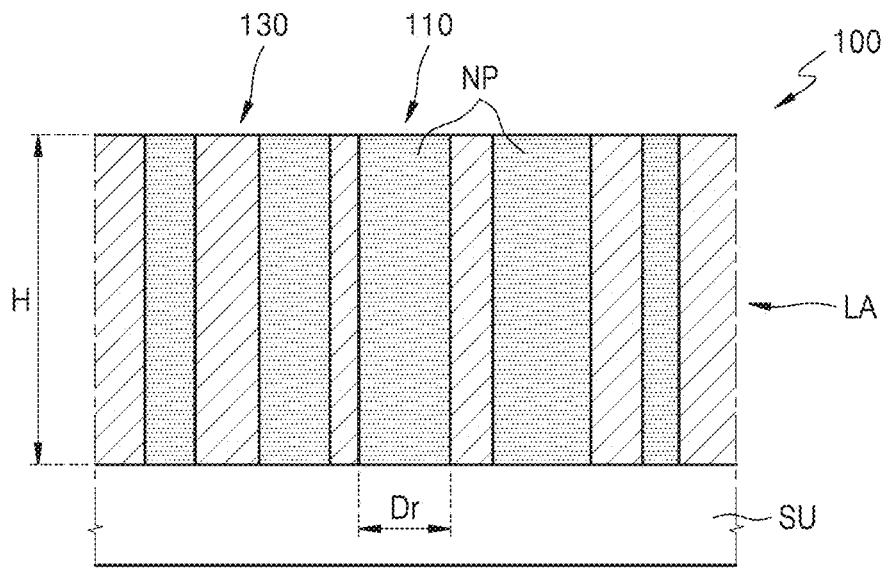
FIG. 1 is a schematic cross-sectional view of a configuration of an optical device according to some example embodiments.

Reference will now be made in detail to embodiments, examples of which are illustrated in the accompanying drawings, wherein like reference numerals refer to like elements throughout. In this regard, various example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at. least one of," when preceding a list of elements, modify the entire list of elements and do not modify the individual elements of the list.

Hereinafter, various embodiments will be described in detail with reference to the accompanying drawings. Various embodiments described hereinafter are merely examples, and example embodiments may be variously modified. In the following drawings, same reference numerals denote same components, and sizes of the components in the drawings may be exaggerated for clarity and convenience of explanation.

Hereinafter, a component referred to as being "above" or "on" may be directly on another component or above the another component in a non-direct manner.

Terms such as "first", "second", and the like may be used to describe various component, but are only used to distinguish one component from other components. Such terms are not intended to limit difference between substances or structures of the components.

Unless clearly described otherwise, an expression used in the singular may encompass an expression in the plural. When a part "includes" or "comprises" a component, unless described otherwise, it means the part may further include other components, not excluding the other components.

Terms such as "part", "module" described in the specification indicates a unit configured to process at least one function or operation, which may be implemented by hardware, software, or a combination of hardware and software.

The use of the terms "a", "an", and "the" and similar referents in the context are to be construed to cover both the singular and the plural.

Steps of a method may be performed in any suitable order unless clearly indicated to be performed in described orders. Furthermore, use of any and all exemplary terms (e.g., "such as) is intended merely to better describe embodiments and is not limited by claims, and the scope of the inventive concept is not limited by the terms.

FIG. 1 is a schematic cross-sectional view of a configuration of an optical device 100 according to some example embodiments.

The optical device 100 includes a planar diffraction device modulating a phase of incident light. The optical device 100 includes a support substrate SU and a nanopattern layer LA on the support substrate SU. The nanopattern layer LA forms a refractive index distribution exhibiting a phase delay profile for implementing various, such as variously desired optical performances with respect to light in a desired wavelength band, and includes a high refractive index pattern 130 and a low refractive index pattern 110. The high refractive index pattern 130 and the low refractive index pattern 110 are or include a pattern including a material with a relatively high refractive index and a pattern including a material with a relatively low refractive index with reference to each other. The nanopattern LA may include, for example, the high refractive index pattern 130 including a crystalline compound with a refractive index greater than 3 with respect to light in a visible light wavelength band (or in the visible spectrum), and a height H from a surface of the support substrate SU may be equal to or less than about 1 micron/μm, e.g. equal to or less than 500 nm.

The support substrate SU may include a transparent substrate. The supporting substrate SU may include, for example, one or more of a glass substrate, a quartz substrate, a silicon oxide ($SiO_2$) substrate, or a polymer substrate such as polyethylene terephthalate (PET), polymethyl methacrylate (PMMA), polydimethylsiloxane (PDMS) and the like.

A crystalline compound included in the high refractive index pattern 130 may include a Group III-V semiconductor compound that is monocrystalline and/or polycrystalline, for example, one or more of gallium phosphide (GaP), aluminum phosphide (AlP), indium phosphide (InP), gallium nitride (GaN), aluminum nitride (AlN), aluminum gallium phosphide (AlGaP), or an alloy thereof.

The crystalline compound included in the high refractive index pattern 130 may have a refractive index of 3 or greater, e.g. a refractive index of 3.5 or greater with respect to light in a visible light wavelength band, and may have an extinction coefficient of $10^{-3}$ (0.001) or less or an extinction coefficient of $10^{-5}$ (0.00001) or less.

The crystalline compound may grow according to a selective epitaxial growth method, and may form the high refractive index pattern 130. This method will be described later with reference to FIG. 7 and below.

The low refractive index pattern 110 includes a material having a refractive index lower than the refractive index of the high refractive index pattern 130. The low refractive index pattern 110 may include a material having a low refractive index material, for example, one or more of $SiO_2$, $MgF_2$, and $Si_3N_4$.

The optical device 100 includes the high refractive index pattern 130 and the low refractive index pattern 110, and delays a phase of light transmitted through the optical device 100 according to a refractive index distribution formed by the high refractive index pattern 130 and the low refractive index pattern 110. The degrees of phase delay vary depending on positions at which the refractive index distributions are formed, and the optical device 100 may have other various optical performances such as one or more of a lens, a beam reflector, a beam shaper, according to phase delay types according to positions. Hereinafter, expressions such as "phase", "phase delay", or "phase modulation" indicate a phase of light transmitted through the optical device 100, that is, a relative phase value with respect to a phase of light before being incident on the optical device 100, and the expressions may be used together in the present specification.

In order to operate as a lens having a focal length f with respect to light having a wavelength of λ, the optical device 100 may exhibit a phase delay behavior as follows at a position (x, y) on the optical device 100.

$$\varphi_{1,}(x, y) = \frac{2\pi}{\lambda}\left(\sqrt{(x^2+y^2)+f^2} - f\right) \quad \text{(Equation 1)}$$

For example, theoretically, a gradual phase change occurs at each position as described above, and such phase change, in an actual implementation, occurs in units of unit cells. A size of a unit cell may satisfy a condition of a certain size or less to prevent higher order diffraction. For example, considering such unit cell as a single waveguide having a height of H, a propagation phase of a light wave transmitted through the unit cell may be expressed as follows:

$$\varphi_{wg} = \frac{2\pi}{\lambda} n_{eff} H \quad \text{(Equation 2)}$$

wherein, $n_{eff}$ (n eff) is an effective refractive index and is dependent on a shape (a width, and/or a height) of the nanopattern forming the refractive index distribution, for example, the shape of the high refractive index pattern 130 and the low refractive index pattern 110.

A phase change such as in Equation (1) may be applied to a region of the optical device 100 partitioned into a plurality of Fresnel zones. Each of the plurality of Fresnel zones includes a plurality of unit cells, and the unit cells may be set such that the phase is reset to zero at an initial point of each region and a phase delay in a range from zero to 2 pi (2π) occurs in each Fresnel zone due to the unit cells. An effective refractive index change $\Delta n_{eff}$ is to satisfy the following condition so that a range of maximum phase modulation in each region is 2 pi (2π):

$$H = \frac{\lambda}{\Delta n_{eff}} \quad \text{(Equation 3)}$$

from the expression, it is found that the height of structure may be reduced in accordance with increase in differences between refractive indexes included in the refractive index distribution.

In the optical device 100 according to various example embodiments, the high refractive index pattern 130 is formed by using a crystalline compound, for example, a Group III-V semiconductor material of a monocrystalline type and/or polycrystalline type having a high refractive index and a low extinction coefficient, and therefore is favorable to decrease the height H. In addition or alternatively, the optical device 100 including the low refractive index pattern 110 has a mechanically stable structure, and may sufficiently secure a difference between refractive indexes of the high refractive index pattern 130 and the low refractive index pattern 110, and accordingly, the optical device 100 may operate as a high-efficiency lens even when the height H is small. For example, the difference between the refractive indexes of the high refractive index pattern 130 and the low refractive index pattern 110 may be greater than or equal to 1, e.g. greater than or equal to 1.5, e.g.

greater than or equal to 2, e.g. greater than or equal to 2.5, and in accordance therewith, high efficiency may be obtained when the height of the nanopattern layer LA is decreased to 3 micron (μm) or less, e.g. 2 micron (μm) or less, e.g. 1 micron (μm) or less, or hundreds of nm. Alternatively or additionally, as the height of the nanopattern layer LA is decreased, a shadowing effect, which may occur in the case of a shape manufactured to have a high aspect ratio, may be reduced.

The low refractive index pattern 110 may include a plurality of nanopillars NP, and the high refractive index pattern 130 may surround the plurality of nanopillars NP. The nanopillar NP may have a cylinder shape having a diameter $D_r$ and a height H, but is not limited thereto and may have an oval pillar shape and/or a prism shape such as a rectangular prism shape such as a square prism shape. The diameter $D_r$ of the nanopillar NP is set to satisfy phase delay determined according to positions r, and may have a sub-wavelength diameter, that is, may have a diameter less than an operation wavelength of the optical device 100. For example, when the optical device 100 is or includes a lens operating with respect to a wavelength in the visible light wavelength band or the visible spectrum, the diameter $D_r$ may be smaller than a center wavelength in the visible light wavelength band. As an example, $D_r$ may be in a range of, for example, from about 10 nm to about 500 nm. The height of the nanopillar NP may be greater than the operation wavelength of the optical device 100. The nanopillar NP may have a high aspect ratio greater than 1 to avoid or reduce an optical resonance wavelength. As the aspect ratio increases, phase delay performance of oblique incident light may be degraded, and a shadowing effect in a manufacturing process may cause degradation of performance. Therefore, the height of the nanopillar NP is set or determined to be appropriately based in consideration of theoretical optical performance and possibility of degradation of performance in the manufacturing process. In the optical device 100 in some example embodiments, the low refractive index pattern 110 is first formed, and then the high refractive index pattern 130 is formed in a method of selectively epitaxially growing a crystalline compound, and accordingly, the surface of the high refractive index pattern 130 is hardly damaged or reduced in damage and a desired high refractive index may be implemented or well implemented, and therefore, the aspect ratio of the optical device may be effectively reduced. In some example embodiments, an aspect ratio of the nanopillar NP included in the nanopattern layer LA may be greater than 1 and equal to or less than 20, or may be equal to or less than 50.

Figure 2:
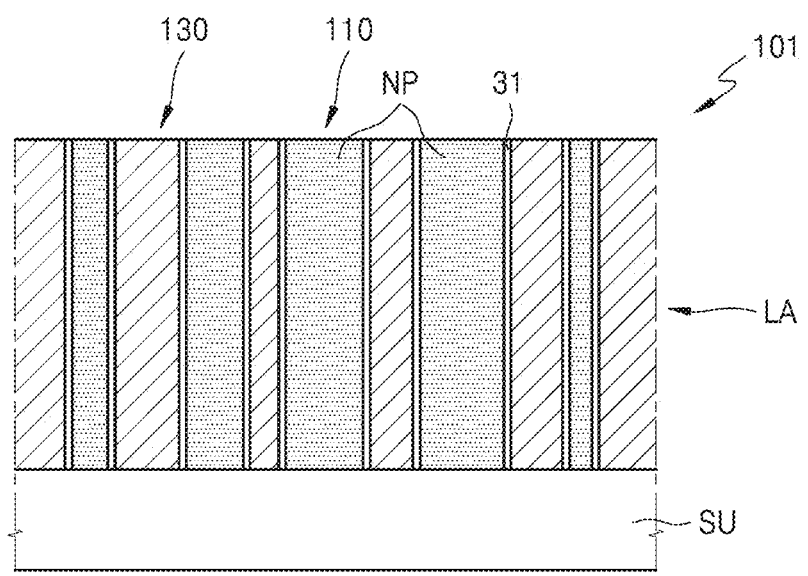
FIG. 2 is a schematic cross-sectional view of a configuration of an optical device according to some example embodiments.

FIG. 2 is a schematic cross-sectional view of a configuration of optical device 101 according to some example embodiments.

The optical device 101 of some example embodiments is different from the optical device 100 of FIG. 1 in that a residual layer 31 is on or formed on or conformal around a boundary surface between the high refractive index pattern 130 and the low refractive index pattern 110. The residual layer 31 includes a material that remains in a manufacturing process or fabrication process of forming the high refractive index pattern 130 by using the crystalline compound. The residual layer 31 may include a wet etching protective material used for protecting the surface of the low refractive index pattern 110 in a process of removing a native oxide layer that may be formed on a surface of a silicon substrate when the crystalline compound is selectively epitaxially grown on the basis of the silicon substrate, for example a native oxide formed by exposure of the optical device 101 to air. The residual layer 31 may include a material having strong resistance to a wet-etching process and being capable of protecting or at least partially protecting the low refractive index pattern 110 in the wet-etching process, for example, may include $SiO_2$, $SiN_x$, $Al_2O_3$, or $HfO_2$.

According to a manufacturing process, the residual layer 31 may not remain in the optical device 100. For example, when the high refractive index pattern 130 includes GaN, which is difficult to be directly grown or epitaxially grown from the silicon substrate, and therefore is grown on the basis of a sapphire substrate or a GaN substrate, a process of removing a native oxide layer, which is performed only when the silicon substrate is used, is not necessary, and accordingly, the wet etching protective material may be not used. Alternatively, even when the crystalline compound included in the high refractive index pattern 130 is grown on the basis of the silicon substrate, the wet etching protective material may be not used when or if the native oxide layer on the surface of the silicon substrate is removed by methods other than a wet etching process.

In the following description of certain example embodiments, the residual layer 31 may be omitted or illustrated, but this is merely an example and is not limited to the illustration. According to a method of manufacturing the high refractive index pattern 130, the residual layer 31 may be provided or not provided.

Figure 3:
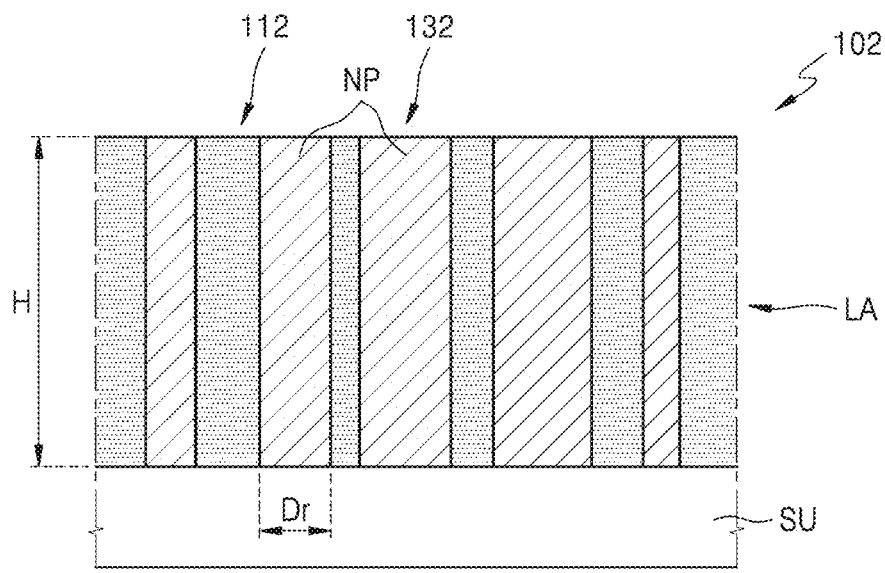
FIG. 3 is a schematic cross-sectional view of a configuration of an optical device according to some example embodiments.

FIG. 3 is a schematic cross-sectional view of a configuration of an optical device 102 according to some example embodiments.

The optical device 102 includes a nanopattern layer LA including a low refractive index pattern 112 and a high refractive index pattern 132. The optical device 102 of the embodiment is different from the optical device 100 of FIG. 1 in that the high refractive index pattern 132 includes a plurality of nanopillars NP and the low refractive index pattern 112 surrounds the plurality of nanopillars NP. Other configurations in the optical device 102 are or may be substantially identical to those of the optical device 100.

Figure 4:
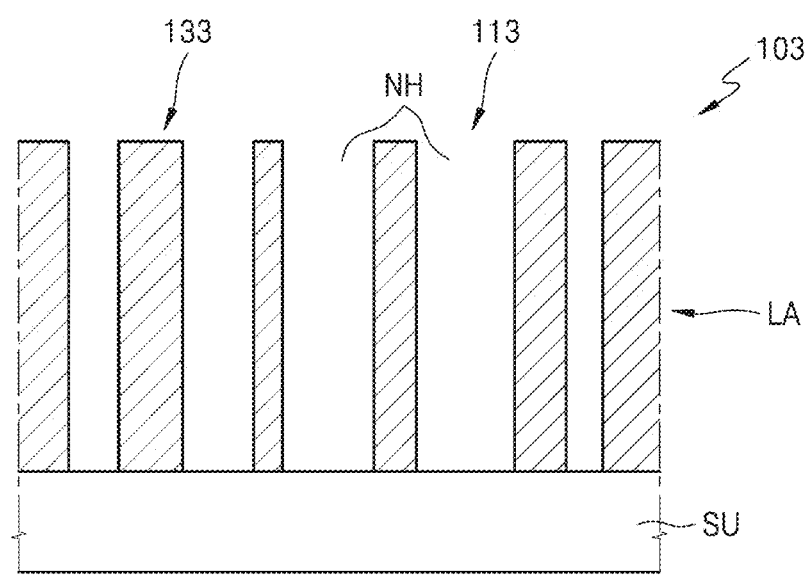
FIG. 4 is a schematic cross-sectional view of a configuration of an optical device according to some example embodiments.

FIG. 4 is a schematic cross-sectional view of a configuration of an optical device 103 according to some example embodiments.

The optical device 103 includes a nanopattern layer LA having a low refractive index pattern 113 and a high refractive index pattern 133. The optical device 103 of various example embodiments is different from the optical device 100 of FIG. 1 in that the low refractive index pattern 113 includes a plurality of nanoholes NH having a pillar shape. For example, in the optical device 103, the nanoholes NH are formed due to an additional process of removing the nanopillars NP which form the low refractive index pattern 110, from the optical device 100 of FIG. 1, and other configurations are substantially identical to those of the optical device 100. Accordingly, a difference between refractive indexes in the nanopattern layer LA may further increase. Alternatively or additionally, compared with a structure in which a high refractive index pattern includes a plurality of nanopillars and a protective layer for protecting the nanopillars is not provided, the above-stated structure provides a same refractive index difference, but is mechanically stable.

Figure 5:
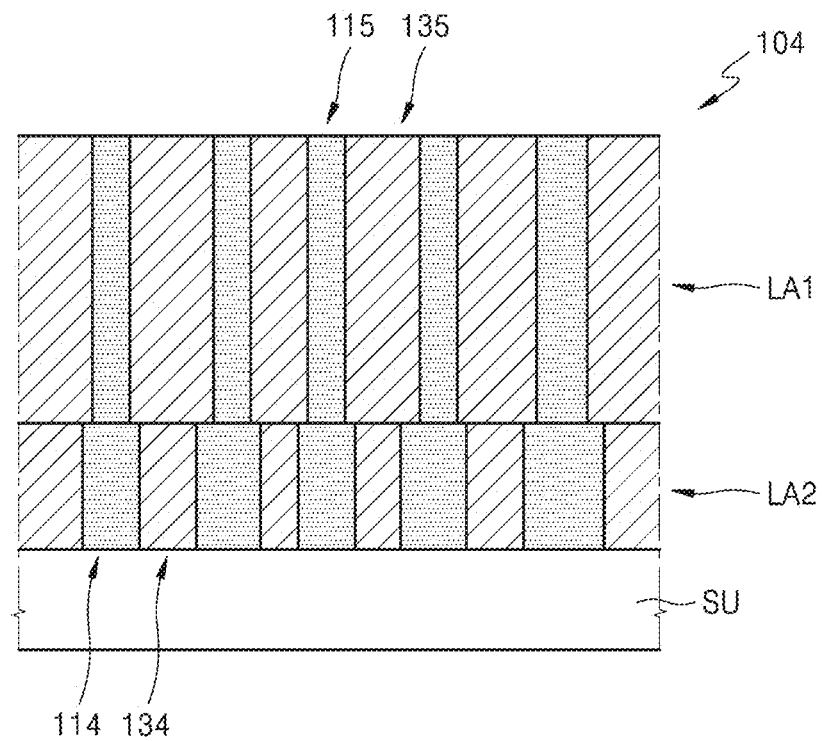
FIG. 5 is a schematic cross-sectional view of a configuration of an optical device according to some example embodiments.

FIG. 5 is a schematic cross-sectional view of a configuration of an optical device 104 according to some example embodiments.

The optical device 104 includes a first nanopattern layer LA1 and a second nanopattern layer LA2. The first nanopattern layer LA1 includes a high refractive index pattern 135 and a low refractive index pattern 115, and the second nanopattern layer LA2 includes a high refractive index pattern 134 and a low refractive index pattern 114. By forming a plurality of nanopattern layers, a refractive index distribution of the optical device 104 and a phase delay profile according thereto may be more delicately adjusted. Descriptions of the nanopattern layer LA of FIG. 1 may be applied to a structure, material, connections, and/or the like of each of the first nanopattern layer LA1 and the second nanopattern layer LA2.

Figure 6:
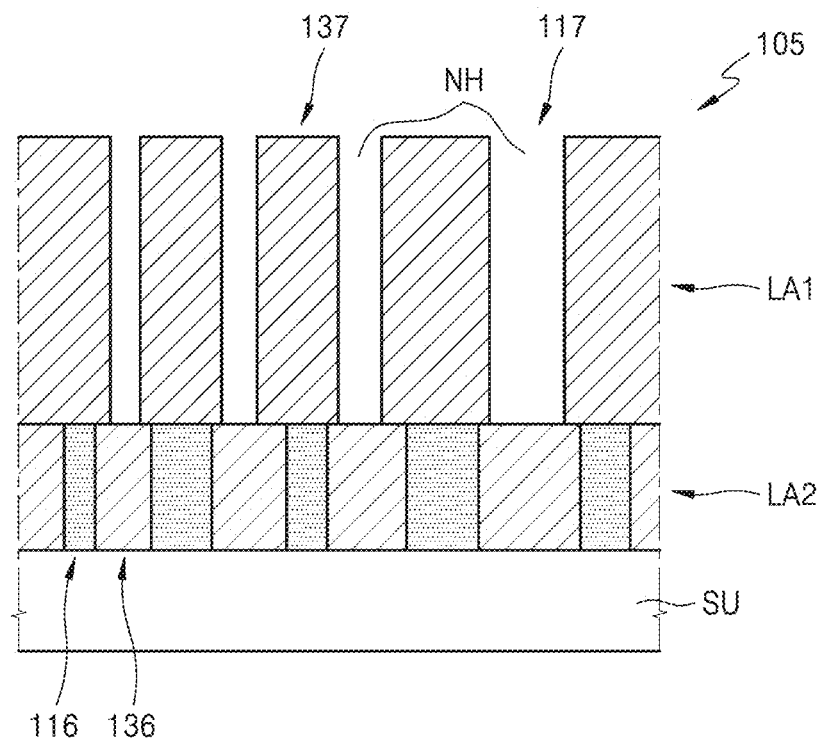
FIG. 6 is a schematic cross-sectional view of a configuration of an optical device according to some example embodiments.

FIG. 6 is a schematic cross-sectional view of a configuration of an optical device 105 according to some example embodiments.

The optical device 105 includes the first nanopattern layer LA1 and the second nanopattern layer LA2. The first nanopattern layer LA1 includes a high refractive index pattern 137 and a low refractive index pattern 117, and the second nanopattern layer LA2 includes a high refractive index pattern 136 and a low refractive index patter 116.

The optical device 105 of some example embodiments is different from the optical device 104 of FIG. 5 in that the low refractive index pattern 116 includes a plurality of nanoholes NH having a pillar shape. In the optical device 105 in the embodiment, the nanoholes NH are formed due to an additional process of removing the nanopillars forming the low refractive index pattern 115 from the optical device 104 of FIG. 5, and other configurations are identical or substantially identical to those of the optical device 104.

In the optical device 100 to 105 according to some example embodiments, a selective epitaxial growth method such as a selective homogeneous epitaxial growth method is used to form the high refractive index pattern of the nanopattern layer, and there might not be a method of performing dry etching on a material having a high refractive index. By doing so, plasma-oriented defects that occur when forming the high refractive index pattern by using a dry etching process may be reduced, e.g. significantly reduced or reduced as much as possible, and furthermore, loss of light due to the plasma-oriented defects is also reduced or reduced as much as possible. Hereinafter, example manufacturing methods will be described.

FIGS. 7A to 7K are diagrams of a method of manufacturing an optical device according to some example embodiments.

Figure 7A:
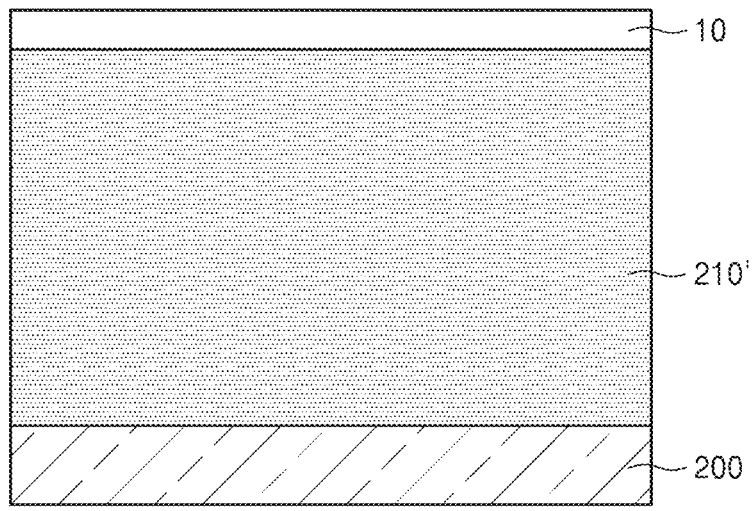
FIGS. 7A to 7K are diagrams for describing a method of manufacturing an optical device according to some example embodiments.

Referring to FIG. 7A, a dielectric layer 210' is formed by depositing a dielectric material on a crystalline substrate 200. A wet etching protective layer 10 may be formed on the dielectric layer 210'.

The crystalline substrate 200 may include one or more of a Si substrate, a sapphire substrate, a gallium arsenide (GaAs) substrate, or a gallium phosphide (GaP) substrate.

The dielectric layer 210' may include a material having a low refractive index, such as one or more of silicon dioxide ($SiO_2$) and magnesium fluoride ($MgF_2$), or an alloy thereof. The dielectric layer 210' may be formed to have a height H' that is greater than a height of the nanopattern layer to be manufactured.

The wet etching protective layer 10 may include a nitride such as $SiN_x$ and/or an oxide such as one or more of $Al_2O_3$, $HfO_2$, $ZrO_2$, $SiO_2$, or the like. The wet etching protective layer 10 is provided to protect or at least partially protect a pattern in a process of removing a native oxide layer on a surface of a silicon substrate after patterning the dielectric layer 210' when the crystalline substrate 200 is a silicon substrate. When the crystalline substrate 200 includes another substrate other than the silicon substrate, the wet etching protective layer 10 may be not provided.

Figure 7B:
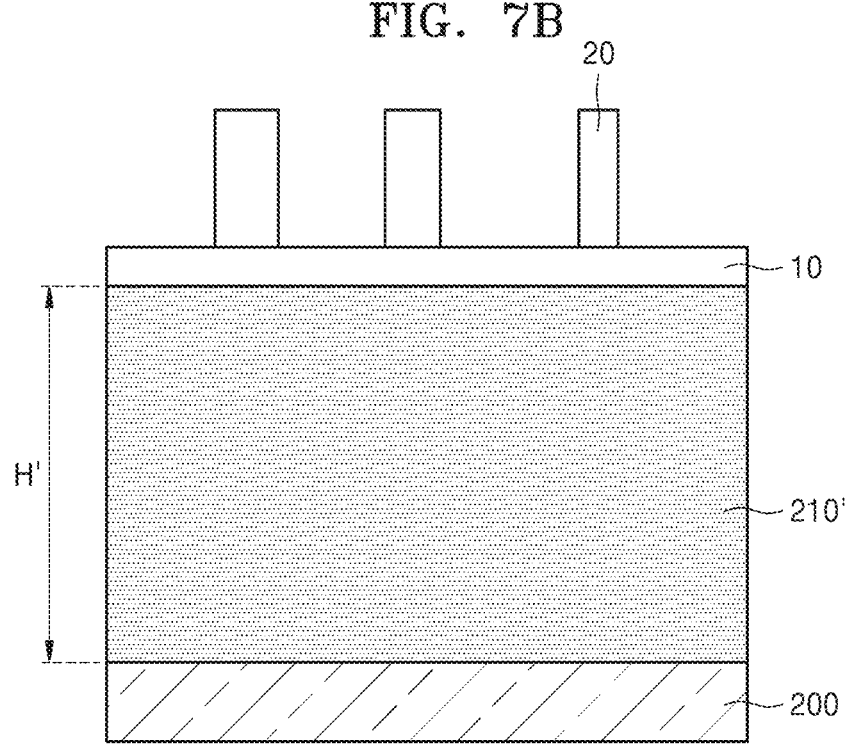
Figure 7C:
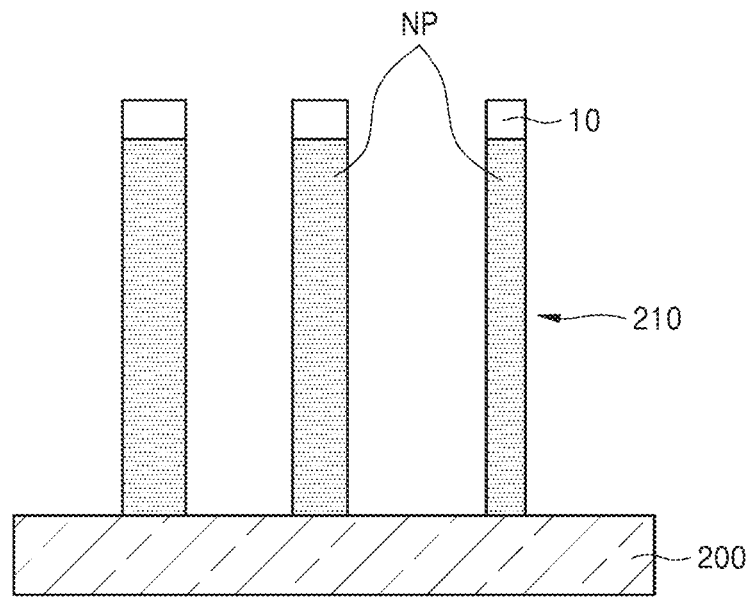

Referring to FIG. 7B, a dry etching mask 20 is formed above the dielectric layer 210'. The dry etching mask 20, which is for patterning the dielectric layer 210', has a pattern suitable for a shape of a low refractive index pattern to be manufactured. The dielectric layer 210' is patterned by using the dry etching mask 20 to form a pattern structure 210 as shown in FIG. 7C. One or more of an inductively coupled plasma-reactive ion etching (ICP-RIE) method, a reactive ion etching (RIE) method, a capacitively coupled plasma (CCP) method, and the like may be used when performing dry etching on the dielectric layer 210'.

Figure 7D:
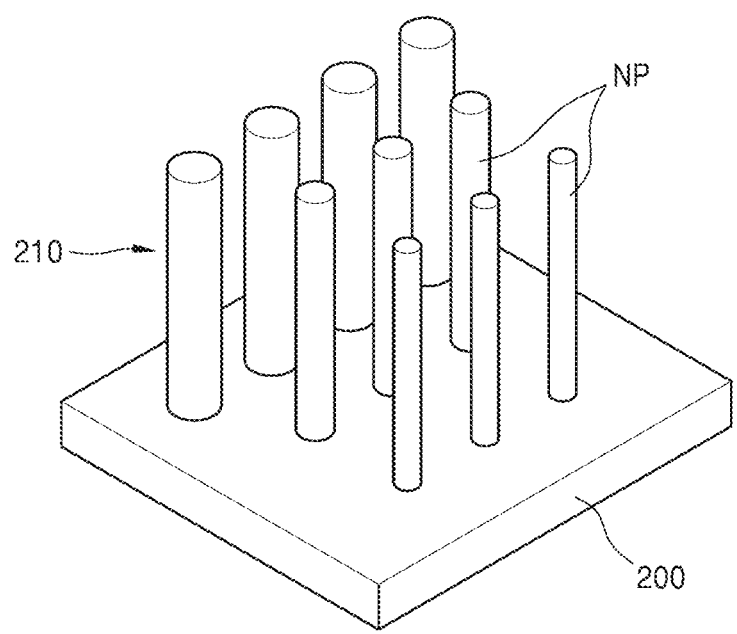

FIG. 7D is a perspective view of an example shape of the pattern structure 210 of FIG. 7C. The pattern structure 210 may include a plurality of nanopillars having a cylinder shape. However, this is merely an example, and the pattern structure 210 may have other shapes such as an oval pillar and/or a polygonal pillar such as a rectangular prism such as a square prism.

Figure 7E:
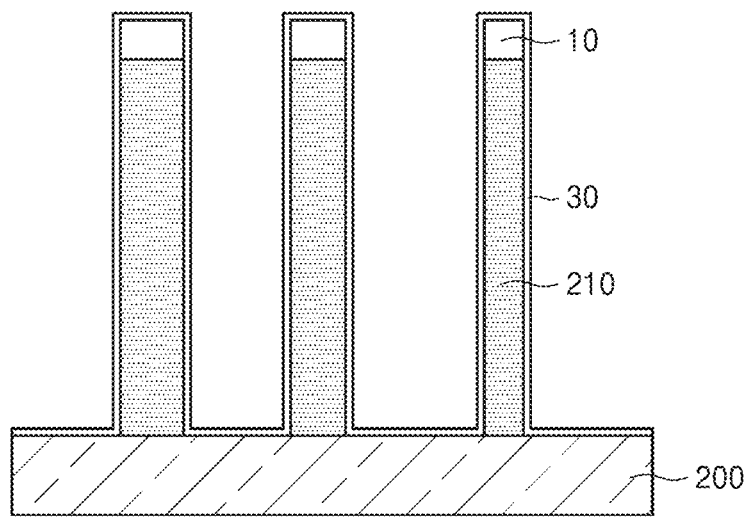

Referring to FIG. 7E, a second wet etching protective layer 30 may be further formed on a side of the pattern structure 210, e.g. may be formed conformally on the pattern structure 210. The second wet etching protective layer 30 may include a nitride such as $SiN_x$ and/or an oxide such as one or more of $Al_2O_3$, $HfO_2$, $ZrO_2$, $SiO_2$, or the like. The second wet etching protective layer 30, like the wet etching protective layer 10, is to protect or at least partially protect the pattern structure 210 in the wet etching process, and may be provided when the crystalline substrate 200 includes a silicon substrate. When the crystalline substrate 200 includes another substrate other than the silicon substrate, the second wet etching protective layer 30 may be omitted. As the second wet etching protective layer 30 is required or is used to well cover side surfaces of the pattern structure 210, a deposition method capable of providing improved or excellent step coverage performance may be used to form the second wet etching protective layer 30. For example, one or more of an atomic layer deposition (ALD), a low-pressure chemical vapor deposition (LPCVD), a plasma enhanced chemical vapor deposition (PECVD), a chemical vapor deposition (CVD), and the like may be used.

Figure 7F:
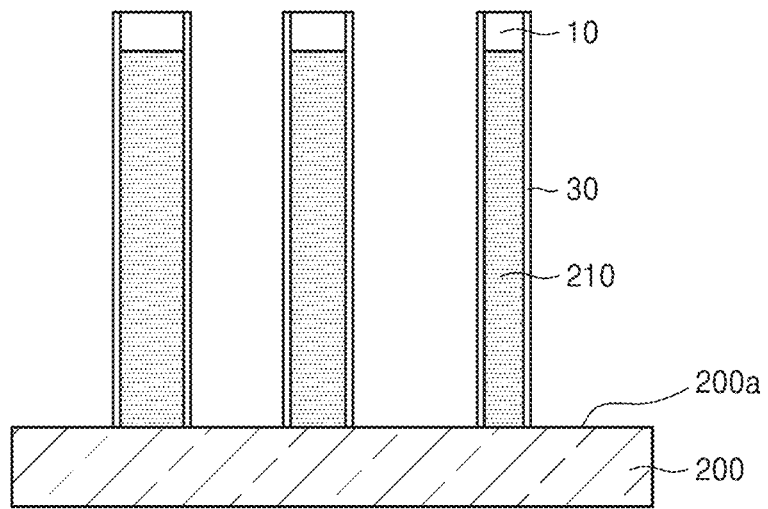

Referring to FIG. 7F, an etch back process may be used to remove the second wet etching protective layer 30 on a surface 200a without the pattern structure 210 in a surface region of the crystalline substrate 200. Next, a native oxide layer formed on the surface 200a of the crystalline substrate 200 may be removed in a wet etching process, e.g. using a chemical etching such as but not limited to hydrogen fluoride or sulfuric acid. In the wet etching process, a side and/or a shape of the pattern structure 210 may be protected well and maintained without or with minimal or reduced damage by the second wet etching protective layer 30. Alternatively or additionally, to remove residual native oxides, in-situ annealing (from a few minutes to tens of minutes under a $H_2$ atmosphere, with a temperature of from about 700° C. to about 1000° C.) may be further performed.

When the crystalline substrate 200 does not include a silicon substrate, the process of removing the native oxide layer described above is not necessary and may not be performed. In this case, another cleaning process may be performed on the crystalline substrate 200. For example, a cleaning process using a solution such as HCl and $(NH_4)_2S$ may be performed. Alternatively or additionally, in situ annealing (from a few minutes to tens of minutes under a $H_2$ atmosphere and a temperature of from about 700° C. to about 1000° C.) may be performed to remove residual impurities from a sample that has been into, for example, a growth device such as a metal organic chemical vapor deposition (MOCVD) device. According to various example embodiments, surface etching by using HCl gas may be performed under a $H_2$ atmosphere.

Figure 7G:
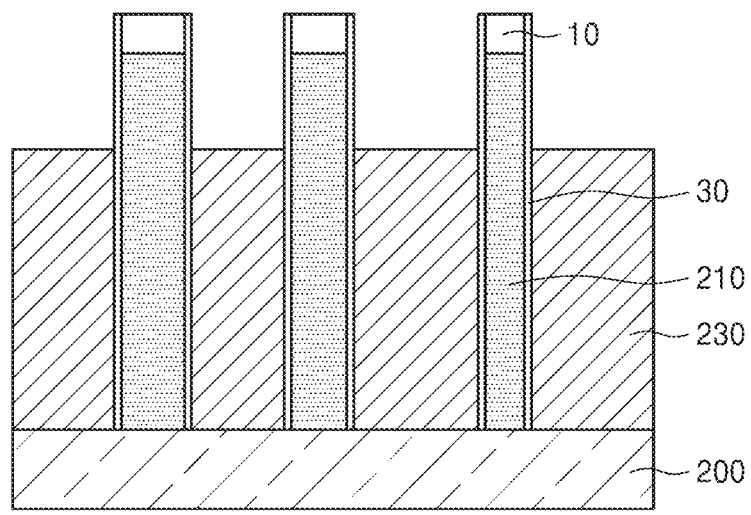

Referring to FIG. 7G, a crystalline material layer 230, which includes a crystalline compound exhibiting a high refractive index and a low extinction coefficient, may be grown or deposited. The crystalline material layer 230 may include a Group III-V semiconductor material that is in a monocrystalline and/or polycrystalline phase, for example, one or more of GaP, AlP, InP, GaN, AlN, InN, or an alloy thereof. For example, GaP may provide a high refractive index of 3.5 and a low extinction coefficient of 105 or less at a 550 nm wavelength. The growth method may include one or more of MOCVD, molecular beam epitaxy (MBE), and hydride vapor phase epitaxy (HVPE). The growth selectively occurs only in a region in which the surface of the crystalline substrate 200 is exposed.

According to crystallinity, growth conditions, and a growth method of the growth substrate, the Group III-V semiconductor material grown as described above may be grown to be monocrystalline crystal and/or polycrystalline crystal including grains of a micrometer-size or submicrometer-size. In a group III-V semiconductor material that is polycrystalline, a crystal orientation of two grains adjacent to each other with reference to a grain boundary is measured as rotated by 60° about a growth direction of the substrate. An energy band gap of AlP is 2.5 eV that is higher than an energy band gap (up to 2.26 eV) of GaP, and accordingly, when using AlP and/or AlGaP, a Group III-V material providing a low extinction coefficient and a high refractive index even in a region of a wavelength lower than 550 nm may be grown.

Figure 7H:
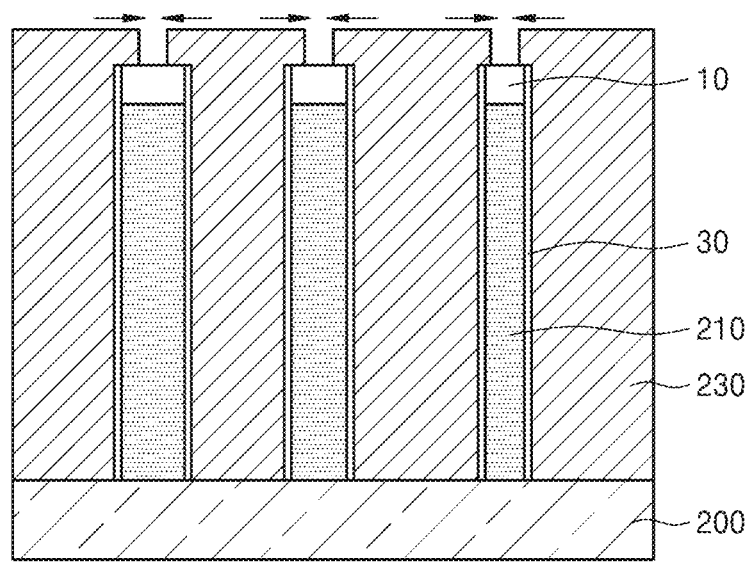

Referring to FIG. 7H, the crystalline material layer 230 may grow or deposit up to a height entirely covering the pattern structure 210. The height to which the crystalline material layer 230 is grown may be different according to positions. This may be because sizes of exposed areas for the growth of the crystalline material layer 230 in the crystalline substrate 200 are different according to positions.

Figure 7I:
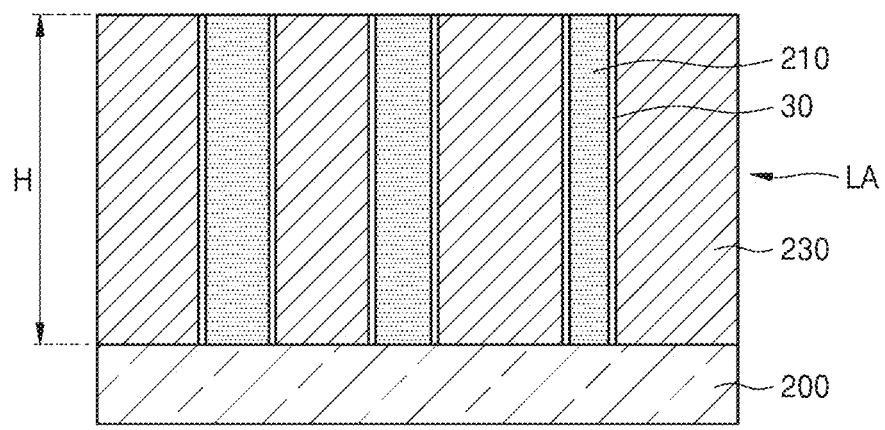

The surface on which the crystalline material layer 230 is differently grown according to positions may be planarized, e.g. uniformly planarized, as shown in FIG. 7I through a chemical-mechanical polishing (CMP) process and/or an etch back process. The height H after planarization may be set suitable for a refractive index distribution to be implemented by the nanopattern layer LA and a phase delay profile according to the refractive index distribution. In this way, the nanopattern layer LA is formed, wherein the pattern structure 210 forms a low refractive index pattern having a low refractive index and the crystalline material layer 230 that is selectively grown forms a high refractive index pattern.

Figure 7J:
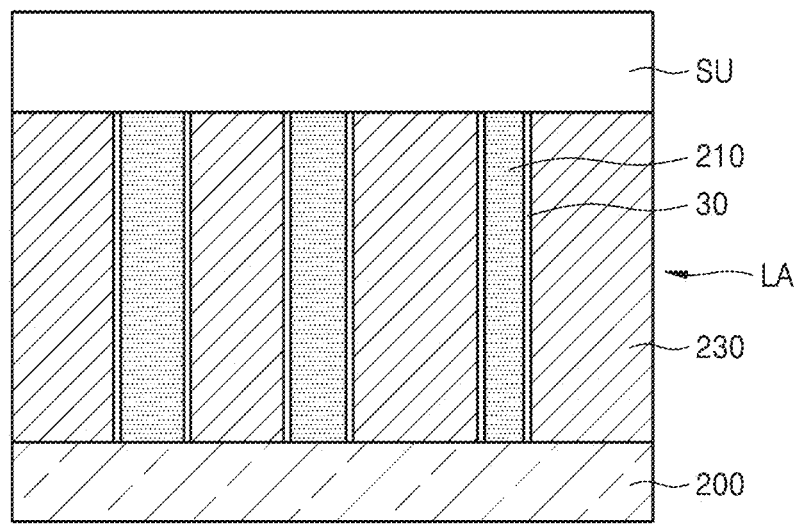

Referring to FIG. 7J, in the structure shown in FIG. 7I, the support substrate SU is attached on a position opposite to the crystalline substrate. For bondage between the support substrate SU and the nanopattern layer LA, direct bonding may be performed after depositing a thin film including $Al_2O_3$, $SiO_2$ and the like on a bonding surface, or indirect bonding may be performed using an organic-based or inorganic-based bonding agent.

Figure 7K:
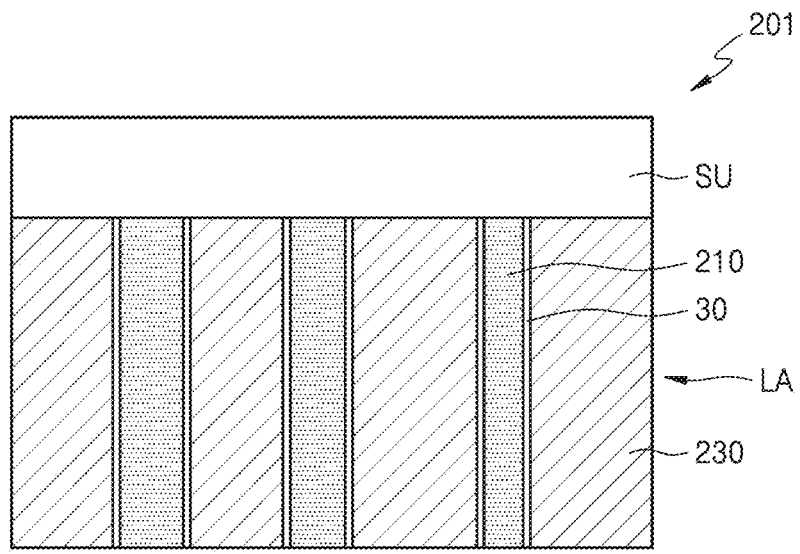

Next, as shown in FIG. 7K, the crystalline substrate 200 may be removed. Thinning, e.g. backside thinning, by using one or more of a CMP method, a lift-off method, or a method by using a chemical etchant may be used in combination for removing the crystalline substrate 200.

According to the methods described above, an optical device 201 including the nanopattern layer LA on the supporting substrate SU may be manufactured, wherein the nanopattern layer LA includes the pattern structure 210 forming or corresponding to the low refractive index pattern and the crystalline material layer 230 forming or corresponding to the high refractive index pattern.

Figure 8A:
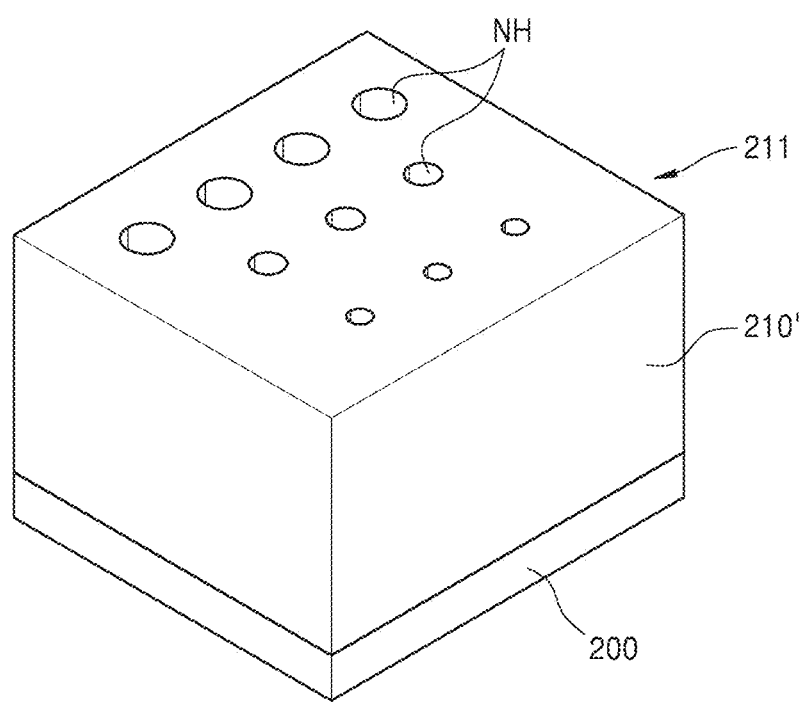
FIGS. 8A and 8B are diagrams for describing a method of manufacturing an optical device according to some example embodiments.
Figure 8B:
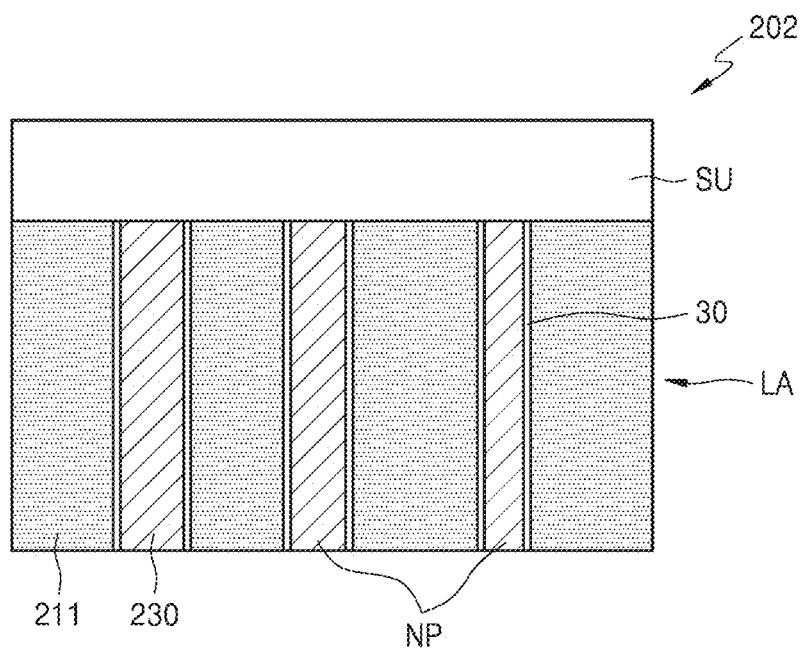

FIGS. 8A and 8B are diagrams for describing a method of manufacturing an optical device according to some example embodiments.

In the description of the manufacturing methods described above, the pattern structure 210 is illustrated as including the plurality of nanopillars NP as shown in FIG. 7D, but this is merely an example, and the pattern structure 210 may be modified into other shapes.

For example, as shown in FIG. 8A, a pattern structure 211 may include or define a plurality of nanoholes NH having a pillar shape penetrating through the dielectric layer 210' formed on the crystalline substrate 200. For example, the pattern structure 211 may formed into a reverse shape of the pattern structure 210 of FIG. 7D. The pattern structure 211 may be used to perform the processes shown in FIGS. 7E to 7J and manufacture an optical device 202 as shown in FIG. 8B. The optical device 202 includes the nanopattern layer LA, and unlike shown in FIG. 7K, the nanopattern layer LA has a structure in which the crystalline material layer 230 forms a high refractive index pattern including a plurality of nanopillars NP and the pattern structure 211 forms a low refractive index pattern surrounding the plurality of nanopillars NP.

FIGS. 9A to 9D are diagrams for describing a method of manufacturing an optical device according to some example embodiments.

The method in some example embodiments is related to a method of manufacturing an optical device including a plurality of nanopattern layers, and additional processes, for example, one or more of the processes shown in FIGS. 7A to 7I, may be further performed on the structure shown in FIG. 7I. Accordingly, repeated description will be omitted, and only example structures to be manufactured will be briefly described.

Figure 9A:
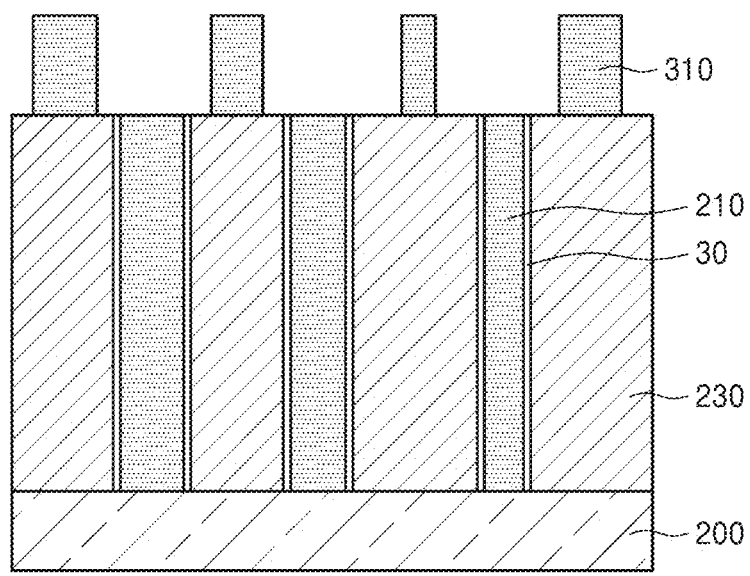
FIGS. 9A to 9D are diagrams for describing a method of manufacturing an optical device according to some example embodiments.
Figure 9B:
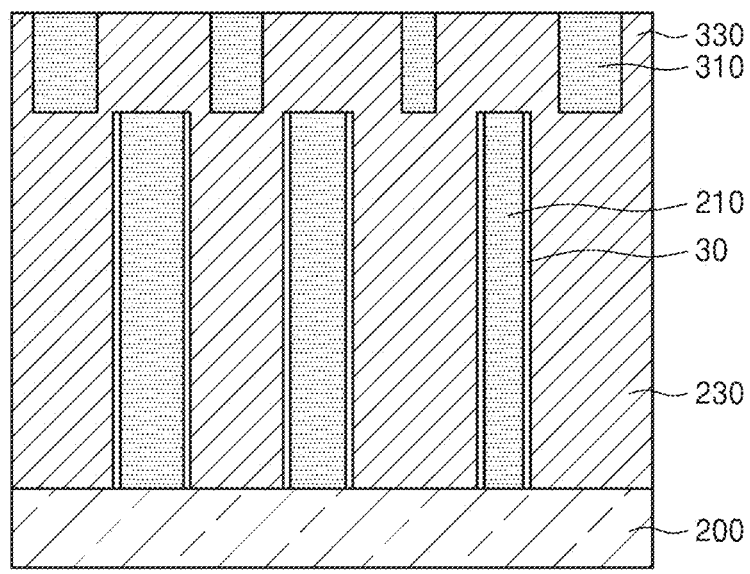
Figure 9C:
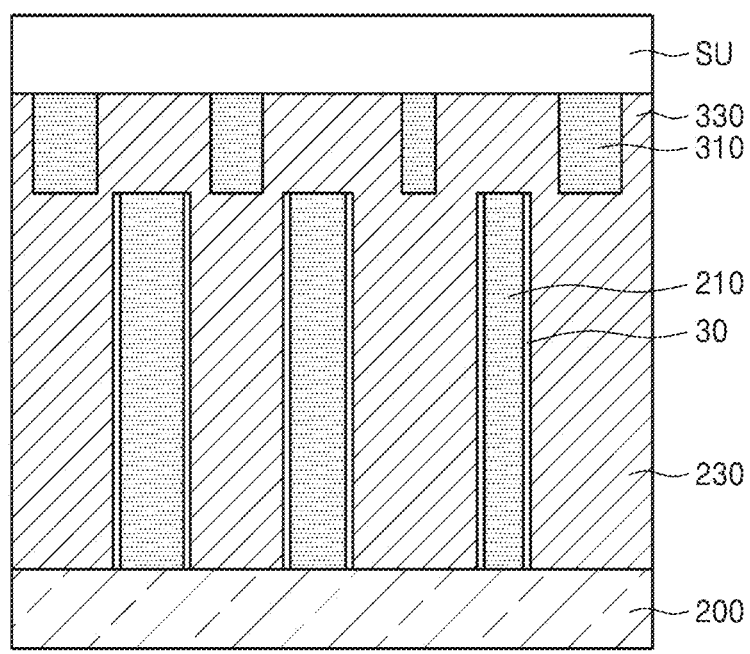
Figure 9D:
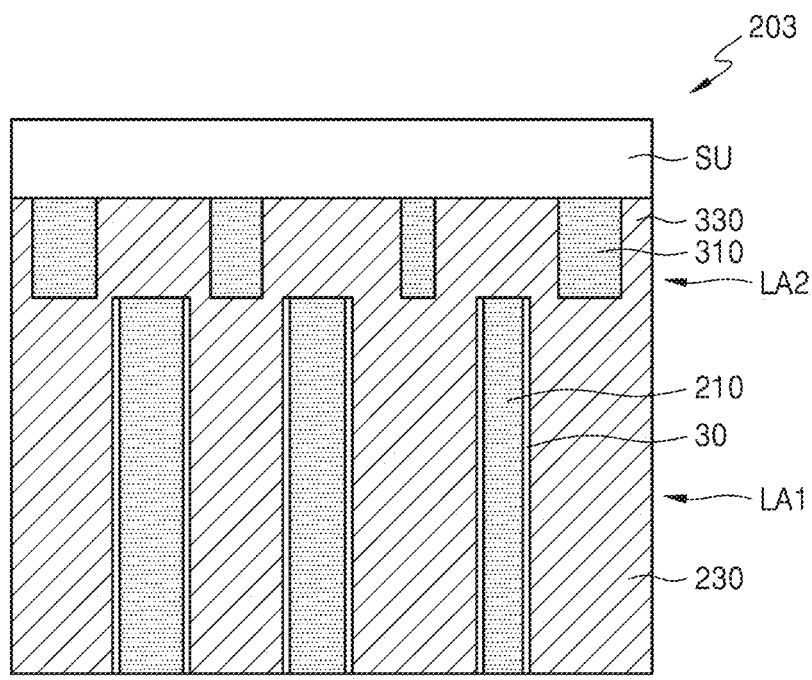

As shown in FIG. 9A, a pattern structure 310 may be formed by using a dielectric material. The pattern structure 310 may include a plurality of nanopillars as shown in 7D, or alternatively, may have a shape reversed from the pattern structure of FIG. 7D, as shown in FIG. 8A. Next, a crystalline compound 330 is grown or deposited as shown in FIG. 9B, and the crystalline substrate 200 is removed after bonding the support substrate SU, as shown in FIG. 9C. As shown in FIG. 9D, an optical device 203 that is manufactured may include the second nanopattern layer LA2 and the first nanopattern layer LA1 sequentially arranged on the substrate SU. In the second nanopattern layer LA2, the crystalline compound 330 forms a high refractive index pattern and the pattern structure 310 forms a low refractive index pattern; and in the first nanopattern layer LA1, the crystalline material layer 230 forms a high refractive index pattern and the pattern structure 210 forms a low refractive index pattern.

FIGS. 10A to 10K are diagrams for describing a method of manufacturing an optical device according to some example embodiments.

The manufacturing method of some example embodiments is different from the above-described embodiment in that the pattern structure having the low refractive index is formed by directly patterning the crystalline substrate.

Figure 10A:
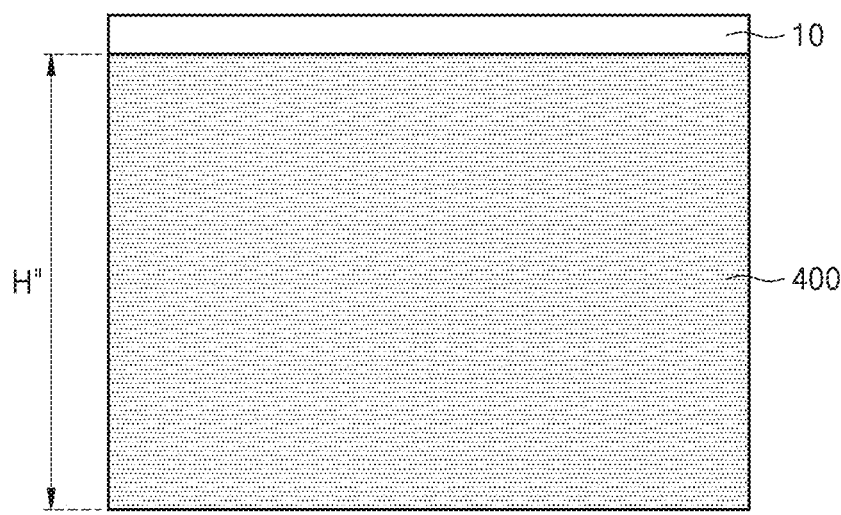
FIGS. 10A to 10K are diagrams for describing a method of manufacturing an optical device according to some example embodiments.

Referring to FIG. 10A, a crystalline substrate 400 having a height of H' is prepared. Like in FIG. 7A, the crystalline substrate 400 may include one or more of a Si substrate, a GaN substrate, a sapphire substrate, a GaAs substrate, or a GaP substrate. A thickness of the crystalline substrate 400 may be H" that is greater than the height H of the nanopattern to be manufactured. As to be described later with reference to FIG. 10C, in a sense that a region of the crystalline substrate 400 is formed into a pattern structure by patterning and another region of the crystalline substrate 400 supports the pattern structure, the thickness of the crystalline substrate 400 may be greater than the thickness H' of the dielectric layer 210' described with reference to FIG. 7B. The wet etching protective layer 10 may be formed on the crystalline substrate 400, and as described above, when the crystalline substrate 400 does not include a silicon substrate, the wet etching protective layer 10 may also be omitted.

Figure 10B:
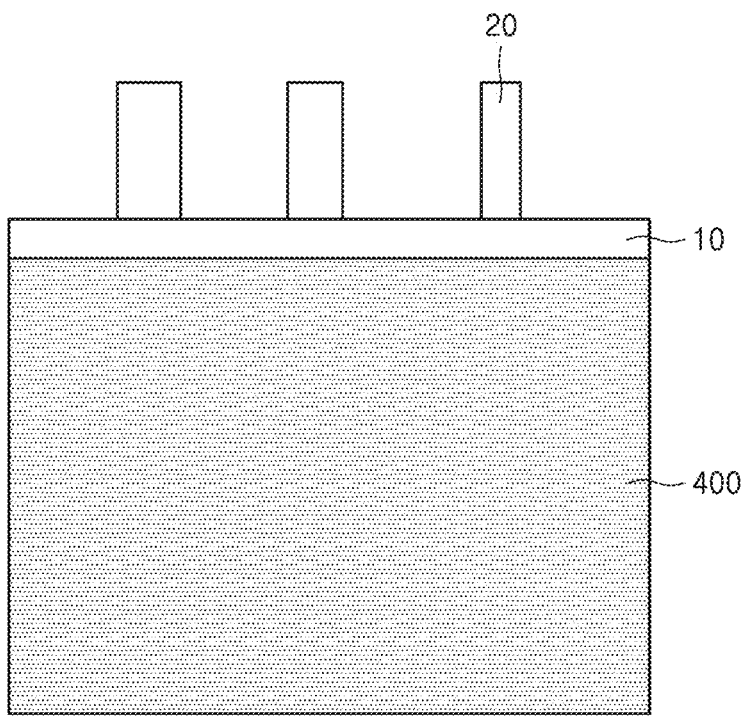
Figure 10C:
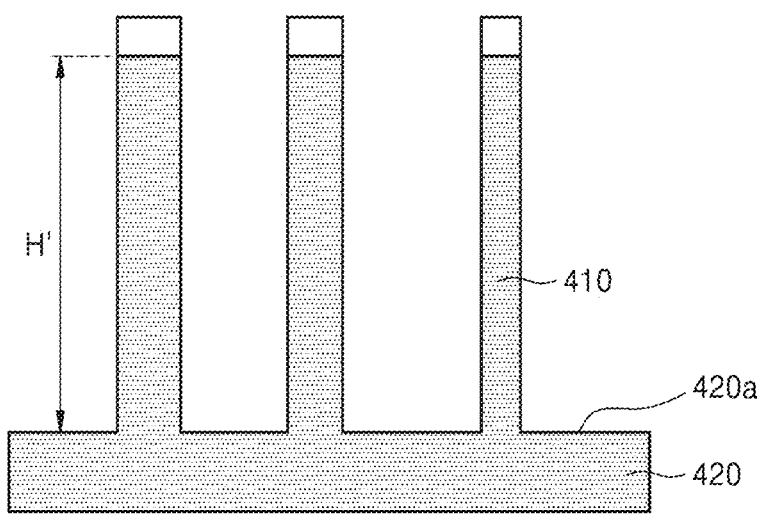

As shown in FIG. 10B, the dry etching mask 20 having a shape suitable for the pattern to be manufactured is formed above the crystalline substrate 400. The crystalline substrate 400 is patterned by using the dry etching mask 20 to form the pattern structure 410 and a crystalline supporter 420 supporting the pattern structure 410, as shown in FIG. 10C. The height H' of the pattern structure 410 from a top surface 420a of the crystalline supporter 420, that is, the height H' from a bottom surface to which the crystalline substrate 400 is etched, may be greater than the height H of the nanopattern to be manufactured.

Figure 10D:
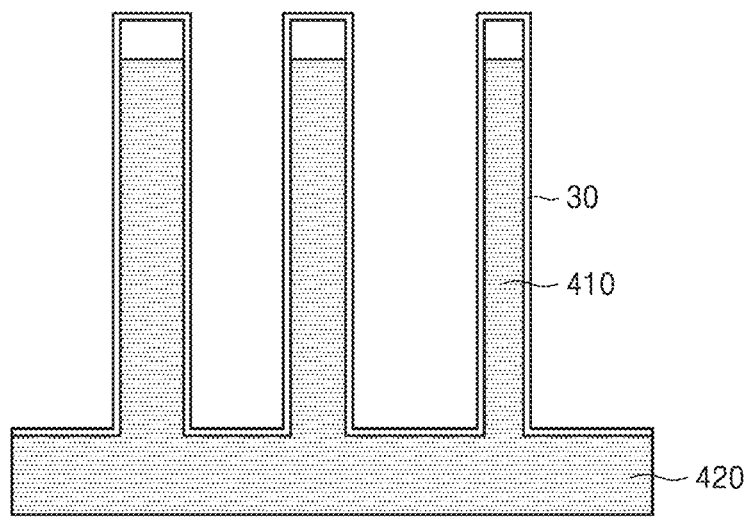
Figure 10E:
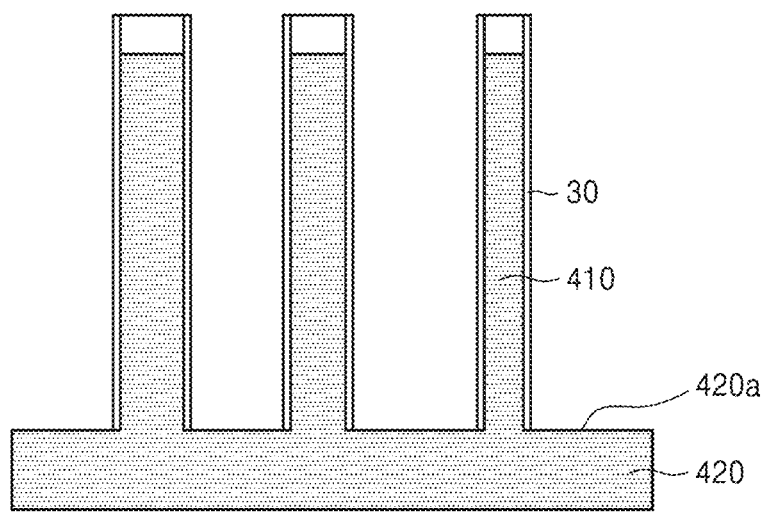

As shown in FIG. 10D, the second wet etching protective layer 30 entirely covering surfaces of the pattern structure 410 and the crystalline supporter 420 may be further formed; and as shown in FIG. 10E, the second wet etching protective layer 30 on the top surface 420a of the crystalline support 420 without the pattern structure 410 may be removed. Next, a native oxide layer on the top surface 420a of the crystalline supporter 420 may be removed by wet etching. As described above, the processes of forming the second wet etching protective layer 30 and removing the native oxide layer may be omitted when the crystalline substrate 400 does not include a silicon substrate.

Figure 10F:
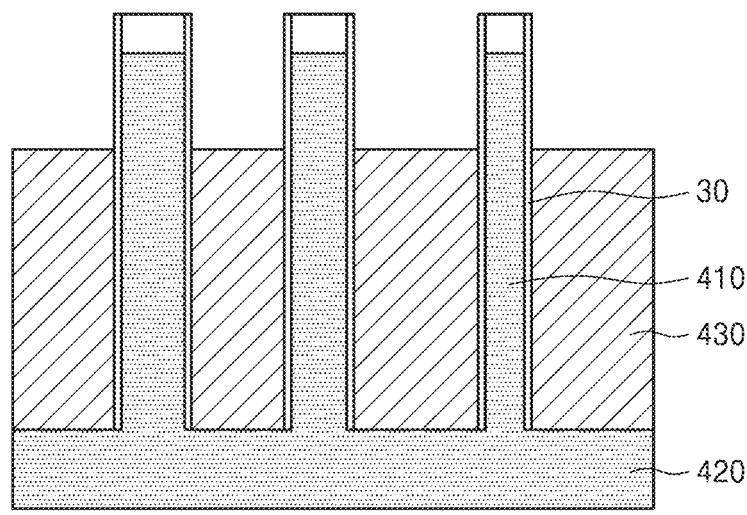
Figure 10G:
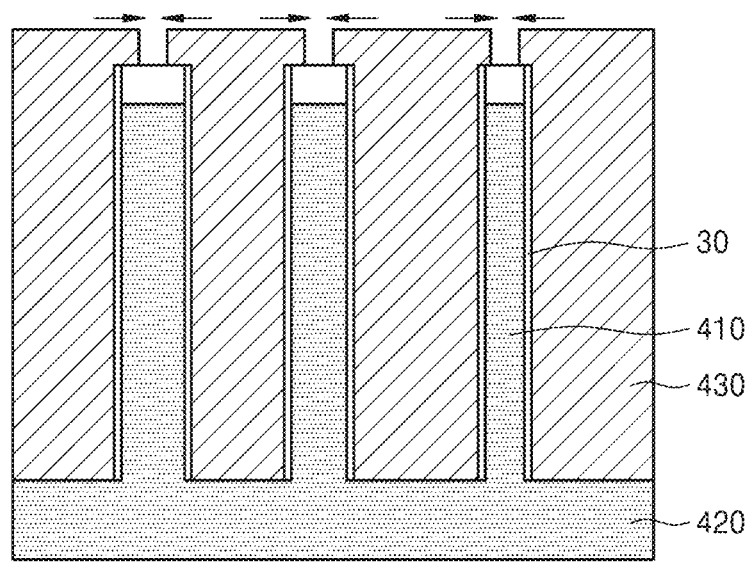

As shown in FIG. 10F, the crystalline material layer 430 may grow from or be deposited on the crystalline supporter 420. As shown in FIGS. 10F to 10J, an optical device 204 is manufactured through processes of growing the crystalline material layer 410, performing a planarization process such as a CMP process, bonding the support substrate SU, and removing the crystalline supporter 420. The processes in FIGS. 10F to 10J are similar to the processes described with reference to FIG. 7G to FIG. 7K.

Figure 10H:
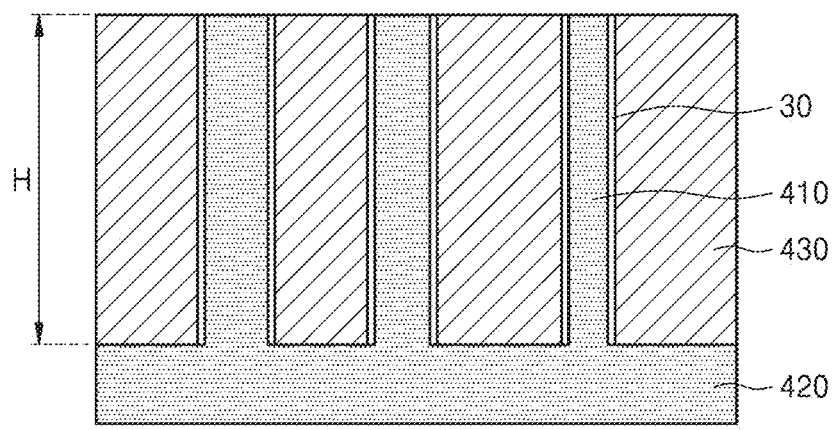
Figure 10I:
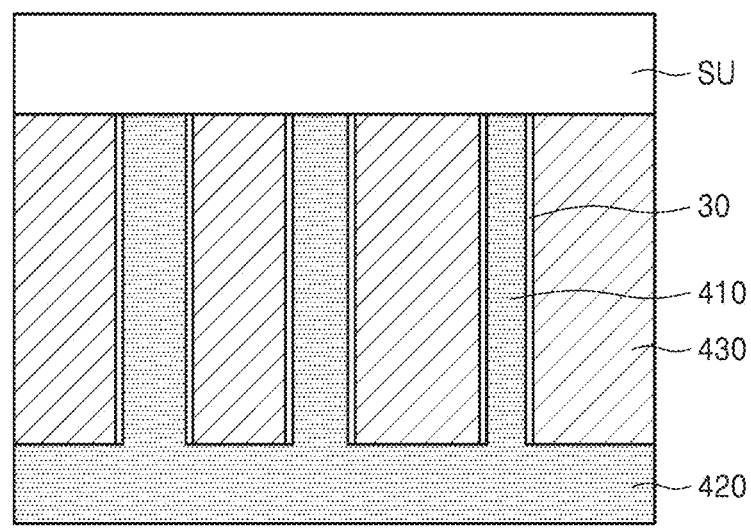
Figure 10J:
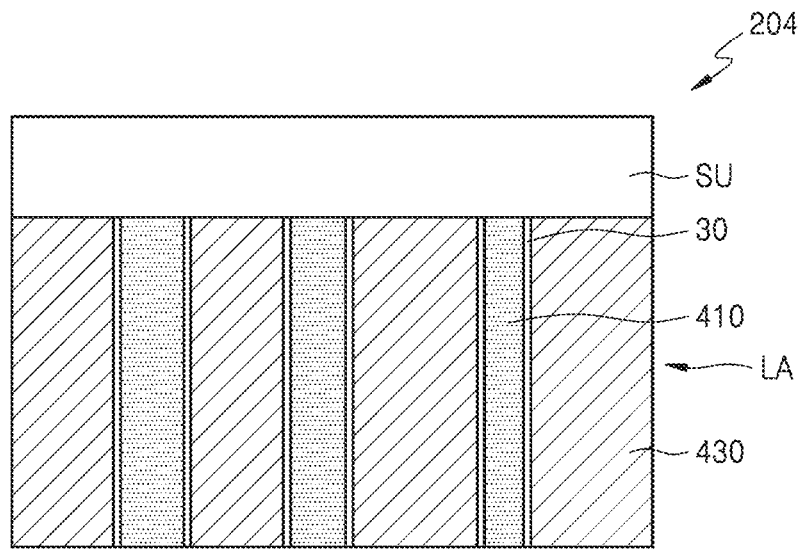
Figure 10K:
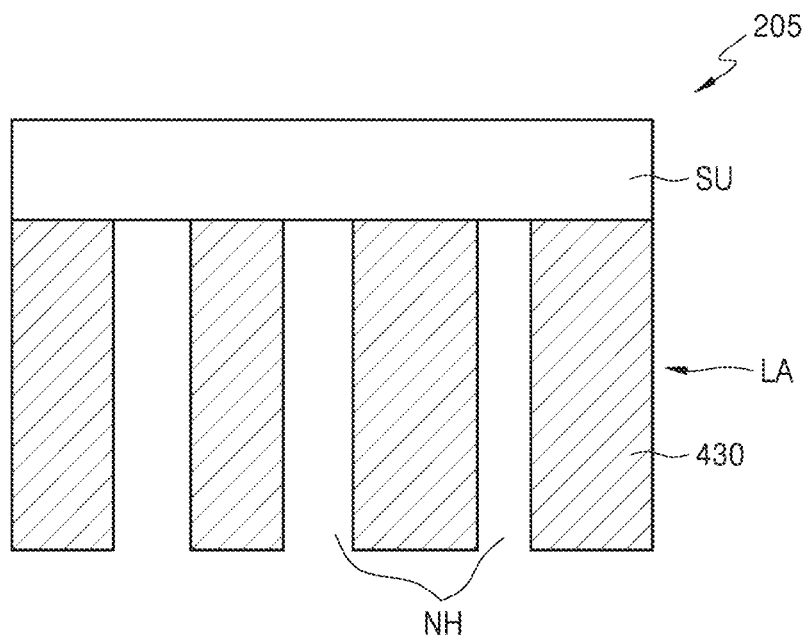

Referring to FIG. 10K, an optical device 205 may be manufactured through an additional process of removing the pattern structure 410 from the structure shown in FIG. 10J, and the optical device 205 may include the nanopattern layer LA in which the plurality of nanoholes NH penetrating through the crystalline material layer 430 are formed.

FIGS. 11A to 11E are diagrams for describing a method of manufacturing an optical device according to some example embodiments.

According to processes shown in FIGS. 11A to 11D, from the structure shown in FIG. 10H, an optical device 206 including the second nanopattern layer LA2 and the first nanopattern layer LA1 sequentially formed on the support substrate SU may be manufactured through additional processes. These processes are substantially identical to the processes described with reference to FIGS. 9A to 9D.

Figure 11A:
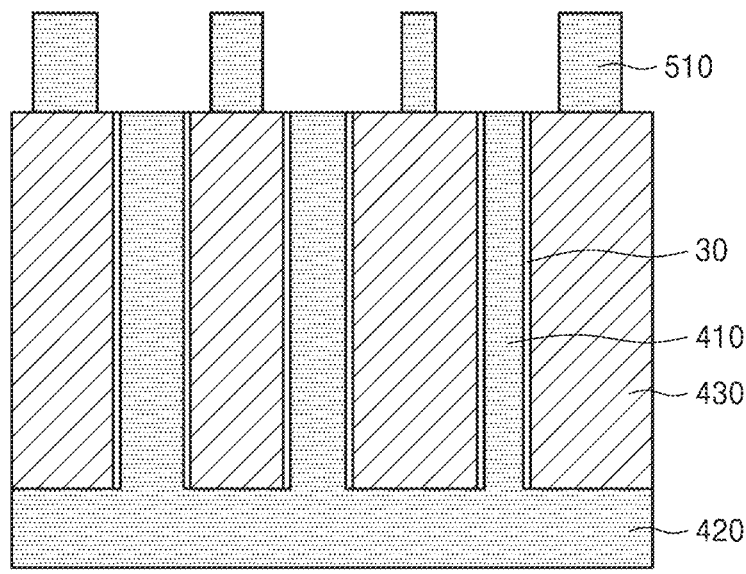
FIGS. 11A to 11E are diagrams for describing a method of manufacturing an optical device according to some example embodiments.
Figure 11B:
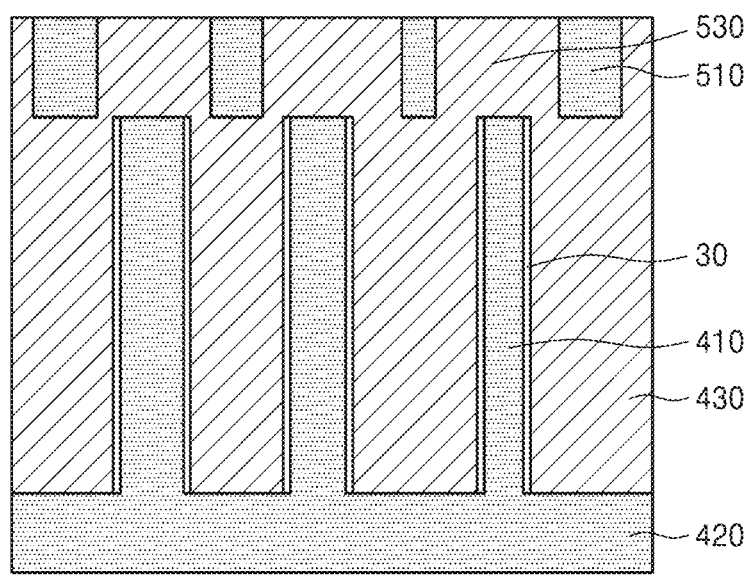
Figure 11C:
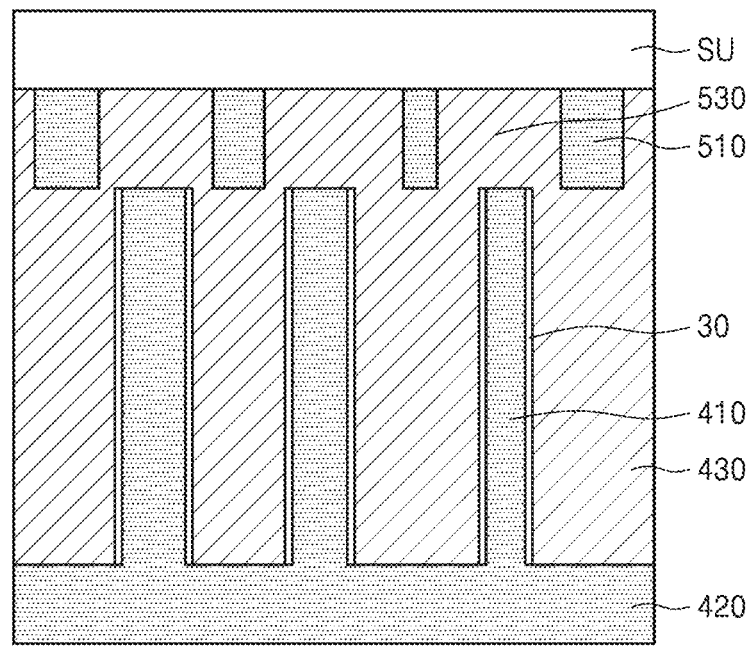
Figure 11D:
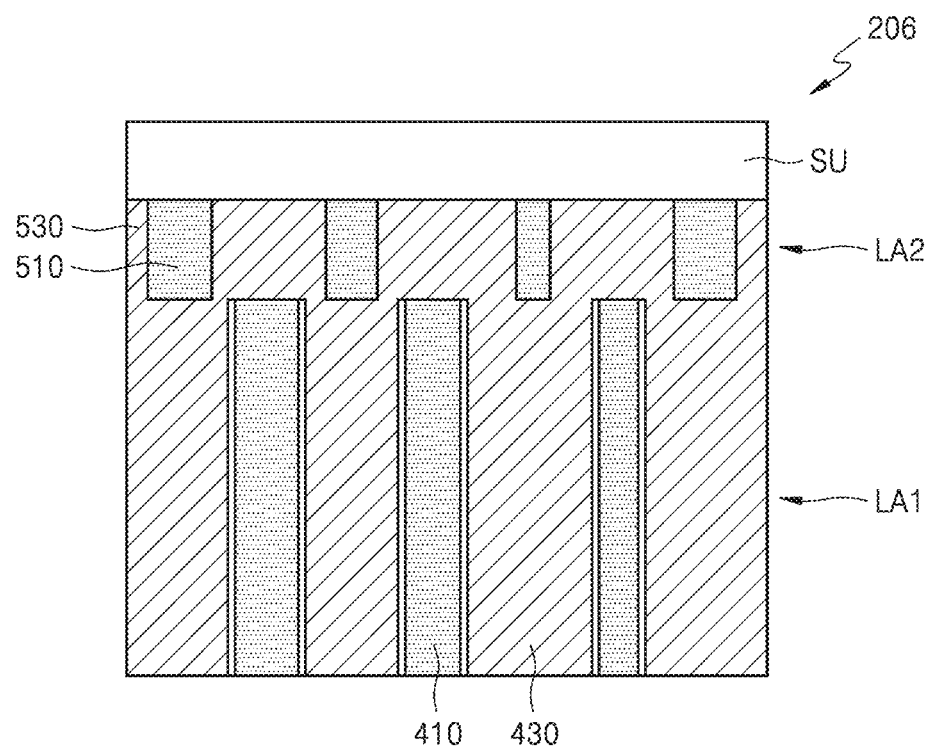
Figure 11E:
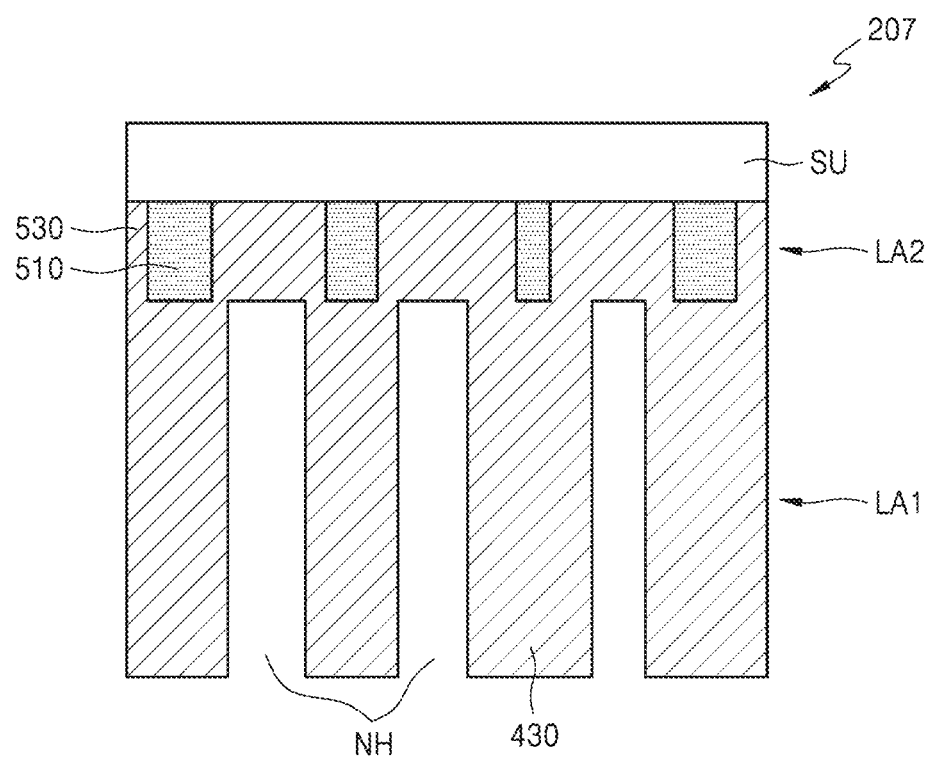

Referring to FIG. 11E, an additional process may be performed to remove the pattern structure 410 from the structure of FIG. 11D. An optical device 207 including the second nanopattern layer LA2 and the first nanopattern layer LA1 sequentially arranged on the support substrate SU may be formed, wherein a plurality of nanoholes NH penetrating the crystalline material layer 430 are formed in the first nanopattern layer LA1.

Although the optical devices 206 and 207 each including two nanopattern layers are illustrated, the optical devices are not limited thereto and may be modified to include three or more nanopattern layers, each of which have the same or different thicknesses and/or material compositions, etc.

The optical devices manufactured according to the descriptions may exhibit desired phase delay profiles with respect to light in desired wavelength bands or spectrums, and may be used as various optical devices. For example, the optical devices may well implement phase delay values set according to regions with respect to light in the visible light wavelength band and therefore may function as optical lenses, and may be applied to various electronic devices in which the optical devices may be used.

Figure 12:
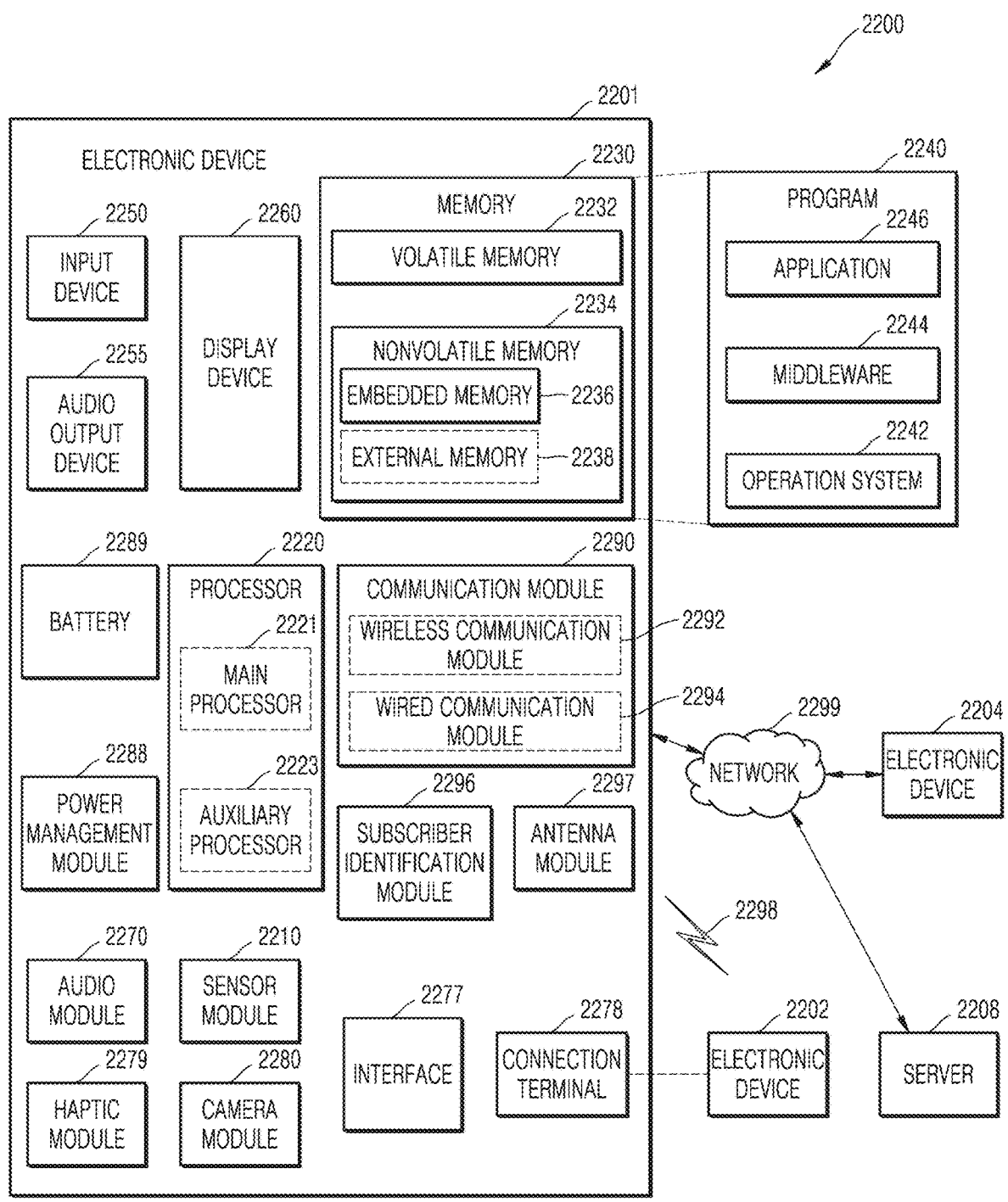
FIG. 12 is a schematic block diagram of a configuration of an electronic device including an optical device according to some example embodiments.
Figure 13:
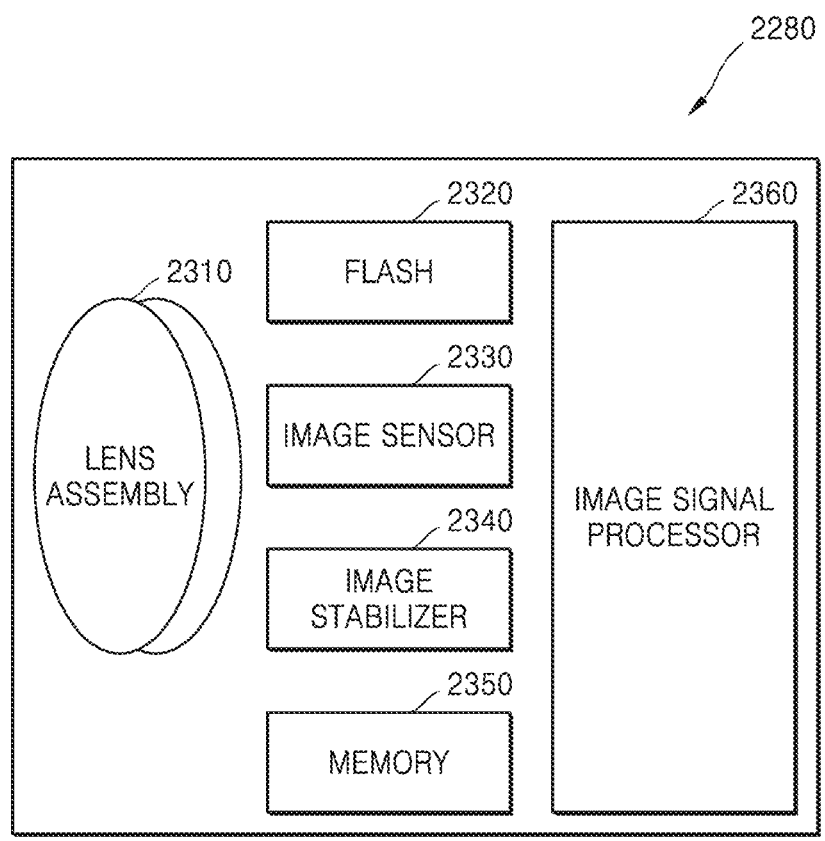
FIG. 13 is a schematic block diagram of a configuration of a camera module included in the electronic device of FIG. 12.

FIG. 12 is a schematic block diagram of a schematic configuration of an electronic device including an optical device according to some example embodiments, and FIG. 13 is a schematic block diagram of a configuration of a camera module provided in the electronic device of FIG. 12.

Referring to FIG. 12, in a network environment 2200, an electronic device 2201 may communicate with another electronic device 2202 through a first network 2298 (a near field wireless communication network and/or the like), and/or may communicate with another electronic device 2204 and/or a server 2208 through a second network 2299 (a long range wireless communication network and.ir the like). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. Some (the display device 2260 and the like) of the components may be omitted or other components may be omitted from/added to the electronic device 2201. Some of the components may be implemented as an integrated circuit. For example, a fingerprint sensor 2211, the iris sensor, the illuminance sensor, and the like of the sensor module 2210 may be embedded in the display device 2260 (for example, a display) for implementation.

The processor 2220 may execute software (the program 2240 and the like) to control one or a plurality of other components (hardware, software components and the like) of the electronic device 2201 connected to the processor 2220, and may perform various kinds of data processing or calculation. As a part of data processing or calculation, the processor 2220 may load a command and/or data received from other components (the sensor module 2210, the communication module 2290, and the like) to a volatile memory 2232, process the command and/or data stored in the volatile memory 2232, and store result data in a nonvolatile memory 2234. The processor 2220 may include a main processor 2221 (a central processing unit, an application processor, and the like) and an auxiliary processor 2223 (a graphics processing unit, an image signal processor, a sensor hub processor, a communication processor, and the like) that may be operated independent from the main processor 2221 or together with the main processor 2221. Compared with the main processor 2221, the auxiliary processor 2223 may use less power and perform specialized functions.

While the main processor 2221 is in an inactive state (a sleep state), the auxiliary processor 2223 may control, in the place of the main processor 2221, functions and/or states related to some (the display device 2260, the sensor module 2210, the communication module 2290) of the components of the electronic device 2201; alternatively, when the main processor 2221 is in an active state (an application execution state), the auxiliary processor 2223 may control, together with the main processor 2221, the functions and/or states of some of the components. The auxiliary processor 2223 (an image signal processor, a communication processor, and the like) may be implemented as a part of other components that are functionally related thereto (for example, the camera module 2280, the communication module 2290, and the like).

The memory 2230 may store various kinds of data needed for or used for the components (the processor 2220, the sensor module 2276, and the like) of the electronic device 2201. The data may include, for example, software (the program 2240 and the like), and input data and/or output data of commands related to the software. The memory 2230 may include the volatile memory 2232 and/or the nonvolatile memory 2234.

The program 2240, which may be stored as software in the memory 2230, may include an operation system 2242, middleware 2244, and/or an application 2246.

The input device 2250 may receive a command and/or data, which is to be used for the components (the processor 2220 and the like) of the electronic device 2201, from the outside (a user and the like) of the electronic device 2201. The input device 2250 may include a microphone, a mouse, a keyboard, and/or a digital pen (a stylus pen and the like).

The audio output device 2255 may output an audio signal to the outside of the electronic device 2201. The audio output device 2255 may include a speaker and/or a receiver. The speaker may have a common use such as playing a multimedia or a record, and the receiver may be used to receive incoming calls. The receiver may be combined to the speaker as a part thereof or may be implemented as an independent and separate device.

The display device 2260 may visually provide information to the outside of the electronic device 2201. The display device 2260 may include a control circuit configured to control a display, a hologram device, a projector, or a corresponding device. The display device 2260 may include a touch circuitry configured to sense touches and/or a sensor circuitry (a pressure sensor and the like) configured to measure an intensity of power generated by the touches.

The audio module 2270 or audio processor may convert sound into an electric signal, or vice versa. The audio module 2270 may obtain sound through the input device 2250, or may output sound through the audio output device 2255 or a speaker and/or headphone of other electronic devices (the electronic device 2102 and the like) connected directly or in a wireless manner to the electronic device 2201.

The sensor module 2210 or sensor processor may sense an operation state (power, temperature, and the like) of the electronic device 2201 or an environmental state of the outside (a user state and the like), and may generate an electric signal and/or a data value corresponding to the sensed state. The sensor module 2210 may include a finger sensor, an accelerations sensor, a position sensor, a three-dimensional (3D) sensor, and may further include an iris sensor, a gyro sensor, a pressure sensor, a magnetic sensor, a grip sensor, a proximity sensor, a color sensor, an infrared (IR) sensor, a bio sensor, a temperature sensor, a humidity sensor, and/or a luminance sensor. The 3D sensor, which is configured to irradiate certain light to a subject and sense a shape and movements of the subject by analyzing light reflected by the subject, may include the optical devices 100, 101, and 102 according to the above-described embodiments or a structure modified from the optical devices 100 to 105 and 201 to 207. The optical device may be applied as a lens, a beam deflector, or a beam shaper, and one or more optical devices may be included in the 3D sensor.

The interface 2277 may include one or more appointed protocols that may be used for direct connection or wireless connection of the electronic device 2201 with other devices (the electronic device 2102 and the like). The interface 2277 may include a high definition multimedia interface (HDMI), a universal serial bus (USB) interface, a secure digital (SD) card interface, and/or an audio interface.

A connection terminal 2278 may include a connector for the electronic device 2201 to be physically connected to other electronic devices (the electronic device 2102 and the like). The connection terminal 2278 may include a HDMI connector, a USB connector, a SD card connector, and/or an audio connector (a headphone connector and the like).

The haptic module 2279 or haptic processor may convert an electric signal into a mechanic stimulus (vibration, motion and the like) or electric stimulus that may be recognized by the user through a haptic or motion sense. The haptic module 2279 may include a motor, a piezoelectric device, and/or an electric stimulus device.

The camera module 2280 or camera may capture a pause image and a moving image. The camera module 2280 may include a lens assembly including one or more lenses, image sensors, image signal processors, and/or flashes. The lens assembly included in the camera module 2280 may collect light emitted from an object, which is a subject of image capture, and the lens assembly may include the optical devices 100 to 105, 201 to 207 according to the above-described embodiments or structures modified therefrom. An example structure of the camera module 2280 will be described later with reference to FIG. 13.

A power management module 2288 may manage power supplied to the electronic device 2201. The power management module 2288 may be implemented as a part of a power management integrated circuit (PMIC).

The battery 2289 may supply power to the components of the electronic device 2201. The battery 2289 may include a non-rechargeable primary battery, a rechargeable secondary battery and/or a fuel battery.

The communication module 2290 or communication processor may support establishment of a direct (wired) communication and/or wireless communication channel between the electronic device 2201 and other electronic devices (the electronic device 2102, the electronic device 2104, the server 2108, and the like) and communication through the established communication channel. The communication module 2290 may include one or more communication processors being independent from the processor 2220 (the application processor and the like) and supporting direct communication and/or wireless communication. A communication module 2290 may include a wireless communication module 2292 (one or more of a cellular communication module, a near field wireless communication module, a global navigation satellite system (GNSS) communication module) and/or a wired communication module 2294 (one or more of a local area network (LAN) communication module, a power line communication module, and the like). From among the communication module, a corresponding communication module may communicate with other electronic devices through the first network 2298 (the near-field communication network) such as one or more of Bluetooth, Wireless-Fidelity (WiFi) direct, or Infrared Data Association (IrDA)) or the second network 2299 (wide-range communication network such as a cellular network, the Internet, or a computer network (one or more of LAN, WAN, and the like)). These various communication modules may be integrated into one component (a single chip and the like) or may be implemented as a plurality of components (a plurality of chips) separate from one another. The wireless communication module 2292 may use subscribe information (an International Mobile Subscriber Identifier (IMSI) and the like) stored in the subscriber identification module 2296 to confirm and authenticate the electronic device 2201 in a communication network such as the first network 2298 and/or the second network 2299.

The antenna module 2297 may transmit a signal and/or power to the outside (other electronic devices and/or the like) or may receive a signal and/or power from the outside. An antenna may include an emitter including a conductive pattern and formed on a substrate (a printed circuit board (PCB) and/or the like). The antenna module 2297 may include one or a plurality of antennas. When the antenna module 2297 includes a plurality of antennas, from among the plurality of antennas, the communication module 2290 may select an antenna suitable for a communication method used in a communication network such as the first network 2298 and/or the second network 2299. Through the selected antenna, a signal and/or power may be transmitted or received between the communication module 2290 and other electronic devices. In addition to the antenna, other components (a radio frequency integrated circuit (RFIC) and the like) may be included as a part of the antenna module 2297.

Some of the components may be connected to one another and exchange signals (commands, data, and the like) through communication methods between peripheral devices (one or more of a bus, General Purpose Input and Output (GPIO), Serial Peripheral Interface (SPI), Mobile Industry Processor Interface (MIPI), and the like).

The command or data may be transmitted or received between the electronic device 2201 and the electronic device 2204 of the outside through the server 2108 connected to the second network 2299. The electronic devices 2202 and 2204 may include devices identical to or different from the electronic device 2201. All or some of operations executed in the electronic device 2201 may be executed in one or more of the electronic devices 2202, 2204, and 2208. For example, when the electronic device 2201 is to perform a certain function or service, may request one or more electronic devices to perform some or all of the function or service, instead of independently executing the function or service. The one or more electronic devices that have received the request may execute an additional function or service related to the request, and may deliver a result of the execution to the electronic device 2201. To this end, one or more of a cloud computing, a distributed computing, and/or client-server computing technology may be used.

Referring to FIG. 13, the camera module 2280 may include a lens assembly 2310, a flash 2320, an image sensor 2330, an image stabilizer 2340, a memory 2350 (a buffer memory and the like), and/or an image signal processor 2360. The lens assembly 2310 may collect light emitted from an object that is subject of image capturing, and may include the optical devices 100 to 105 and 201 to 207 described above or an optical device having a structure modified from the optical devices. The lens assembly 2310 may include one or more meta lenses. The meta lens included in the lens assembly 2310 may have the form of the optical devices 100 to 106 and 201 to 207 or a combination or modification thereof. The meta lens included in the lens assembly 2310 has extraordinary performance of exhibiting a desired phase delay profile with respect to light in a desired wavelength band, and for example, may exhibit high-efficiency lens performance with respect to light in the visible light broadband. A plurality of meta lenses respectively having different focal lengths and effective diameters may be provided. The lens assembly 2310 may simultaneously use a refractive lens and a meta lens to have desired imaging performance. The lens assembly 2310 including the optical device may implement desired optical performances and have a short optical overall length.

Alternatively or additionally, the camera module 2280 may further include an actuator. The actuator, for example, may actuate positions of lens elements included in the lens assembly 2310 and adjust a separation distance between the lens elements for zooming and/or autofocus (AF).

The camera module 2280 may include a plurality of lens assemblies 2310, and in this case, the camera module 2280 may include dual cameras, a 360-degree camera, or a spherical camera. Some of the plurality of lens assemblies 2310 may have same lens features (an angle of view, a focal length, an autofocus, an F number, optical zoom, and the like) or different lens features. The lens assembly 2310 may include an optical lens or a telescope lens.

The flash 2320 may emit light that is used to enhance light emitted or reflected by the object. The flash 2320 may include one or more light-emitting diodes (LED) (one or more of a red-green-blue (RGB) LED, a White LED, an infrared LED, an ultraviolet LED, and the like) and/or a xenon lamp. The flash 2320 may be configured to provide light having a plurality of different wavelengths, and for example, may provide light in a narrow band wavelength such that the optical device included in the lens assembly 2310 exhibit lens performance without chromatic aberration. The image sensor 2330 may convert light, which is reflected or emitted from the object and delivered through the lens assembly 2310 or signal formed by the nanopattern layer included in the lens assembly 2310, into an electrical signal, to thereby obtain an image corresponding to the object. The image sensor 2330 may include one or a plurality of sensors selected from among image sensors having different features such as one or more of an RGB sensor, a black and white (BW) sensor, an IR sensor, or an UV sensor. Each of the sensors included in the image sensor 2330 may be implemented as a charged coupled device (CCD) sensor and/or a complementary metal oxide semiconductor (CMOS) sensor.

The image stabilizer 2340 may move one or the plurality of lenses or the image sensor 2330 included in the lens assembly 2310 in certain directions or control operation characteristics (adjusting a read-out timing and the like) of the image sensor 2330, in response to a motion of the camera module 2280 or the electronic device 2301 including the camera module 2280), to thereby compensate for negative effects caused by the motions. The image stabilizer 2340 may sense motions of the camera module 2280 or the electronic device by using a gyro sensor (not shown) or an acceleration sensor (not shown) arranged at the inside or the outside of the camera module 2280. The image stabilizer 2340 may be implemented as an optical type.

The memory 2350 may store some or all of data of an image obtained through the image sensor 2330, for a next image processing operation. For example, when a plurality of images are obtained at a high rate, the memory 2350 may be used to store obtained raw data (Bayer-patterned data, high definition data, and the like) and only display a low-definition image and then transmit raw data of the selected (user selection and the like) image to the image signal processor 2360. The memory 2350 may be integrated as the memory 2230 of the electronic device 2201 or may be configured as a separate memory that is independently operated.

The image signal processor 2360 may perform one or more image processing operations on the image obtained through the image sensor 2330 or the image data stored in the memory 2350. The one or more image processing operations may include: generating a depth map, three-dimensional modeling, generating a panorama, extracting a feature point, synthesizing images, and/or compensating for images (reducing noise, adjusting definition, adjusting luminance, blurring, sharpening, softening, and the like). The image signal processor 2360 may control (one or more of control on an exposure time period, control on a read-out timing, and the like) the components (the image sensor 2330 and/or the like) included in the camera module 2280. The image processed by the image signal processor 2360 may be stored again in the memory 2350 for additional processing or may be provided to external components of the camera module 2280 (the memory 2230, the display device 2260, the electronic device 2202, the electronic device 2204, the server 2208, and the like). The image signal processor 2360 may be integrated into the processor 2220 or may be configured as a separate processor that is operated independent from the processor 2220. When the image signal processor 2360 is configured as a processor separate from the processor 2220, the image processed by the image signal processor 2360 may undergo additional image processing by the processor 2220 and may be displayed through the display device 2260.

The electronic device 2201 may include a plurality of camera modules 2280 respectively having different features or functions. In this case, one of the plurality of camera modules 2280 may include a wide angle camera, and another may include a telescope camera. Similarly, one of the plurality of camera modules 2280 may include a front camera, and another may include a rear camera.

Figure 14:
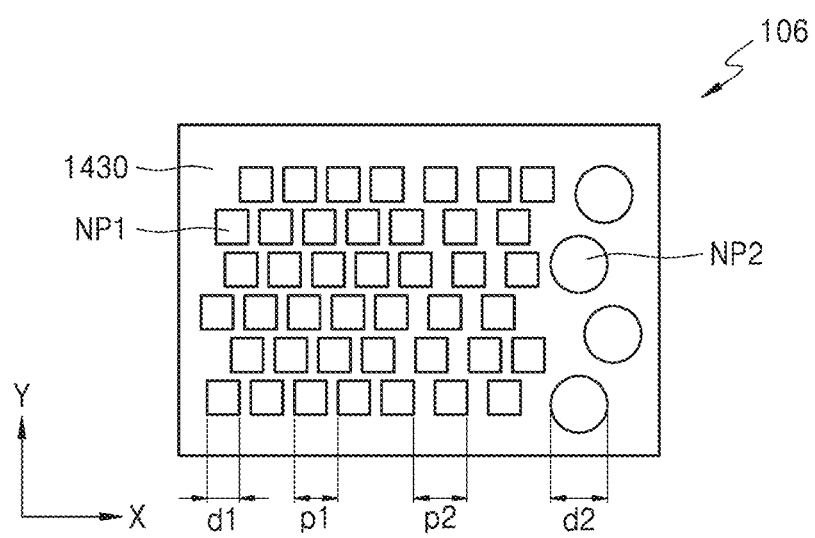
FIG. 14 is a schematic plan view of a configuration of an optical device according to some example embodiments.

FIG. 14 is a schematic plan view of a configuration of an optical device according to some example embodiments. Descriptions of the same or similar features as those of other example embodiments may be omitted for brevity.

Referring to FIG. 14, an optical device 106 may include a plurality of first nanopillars NP1 and a plurality of second nanopillars NP2 surrounded by a crystalline material layer 1430, arranged in a lattice pattern that extends in a first direction X and a second direction Y.

The first nanopillars NP1 may have a first shape in a plan view, such as that of a polygon, such as a square. The first nanopillars NP1 may have a prismatic profile. The first nanopillars NP1 may have a first greatest d1, and may be arranged at various pitches such as pitch p1 and p2.

The second nanopillars NP2 may have a second shape in a plan view, such as that of an oval, such as a circle. The second shape may be different from the first shape.

The second nanopillars NP2 may have another diameter d2 that is different from (greater than or less than) that of the first nanopillars NP1.

While the optical device, the method of manufacturing the same, and the electronic device including the optical device have been described with reference to embodiments shown in the accompanying drawing, this is merely an example, and it will be understood by those of ordinary skill in the art that various modifications and equivalent other example embodiments may be made. Hence, the embodiments should be considered in a descriptive sense only and not for purposes of limitation. The scope of the present specification is defined not by the detailed description but by the appended claims, and all differences within the scope will be construed as being included in variously described example embodiments.

The optical device has a nanopattern including a crystalline compound having a high refractive index and a low absorption rate, and may implement a desired phase profile while having a structure capable of reducing performance degradation according to height.

According to the method of manufacturing the optical device, to form the nanopattern, a method of selectively growing the crystalline compound having a high refractive index and a low absorption rate is used, and therefore, defects due to the manufacturing process may be reduced, e.g. may be reduced as much as possible.

Any of the elements and/or functional blocks disclosed above may be connected to any other ones of the elements and/or functional blocks disclosed above. For example, there may be a one-way or a two-way communication between one element or functional block, and another element or functional block. One element or functional block may be able to send and/or receive data and/or commands to any another element and/or functional block, through a bus such as a wired and/or wireless communication bus.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

It should be understood that various example embodiments described herein should be considered in a descriptive sense only and not for purposes of limitation. Descriptions of features or aspects within each example embodiment should typically be considered as available for other similar features or aspects in other example embodiments, and example embodiments are not necessarily mutually exclusive with one another. While one or more embodiments have been described with reference to the figures, it will be understood by those of ordinary skill in the art that various changes in form and details may be made therein without departing from the spirit and scope as defined by the following claims.

What is claimed is:

1. An optical device comprising:
   a substrate; and
   a nanopattern layer on the substrate and configured to form a refractive index distribution to exhibit a certain phase delay profile with respect to light in a visible spectrum,
   the nanopattern layer comprising a crystalline compound having a refractive index greater than 3 with reference to the light in the visible spectrum and having a height of 2 microns or less from a surface of the substrate,
wherein the nanopattern layer includes,
a high refractive index pattern comprising the crystalline compound; and
a low refractive index pattern comprising a material having a refractive index less than that of the crystalline compound,
wherein the low refractive index pattern comprises a plurality of nanopillars,
wherein the high refractive index pattern surrounds the plurality of nanopillars, and
wherein the high refractive index pattern comprises a selective epitaxial layer of the crystalline compound selectively around the plurality of nanopillars.

2. The optical device of claim 1,
wherein the crystalline compound comprises:
a Group III-V semiconductor compound that is in one or both of monocrystalline phase and polycrystalline phase.

3. The optical device of claim 1, further comprising:
a residual layer on a boundary surface between the high refractive index pattern and the low refractive index pattern, the residual layer comprising a material different from first materials of the high refractive index pattern and second materials of the low refractive index pattern.

4. The optical device of claim 3, wherein residual pattern includes at least one of $SiN_x$, $Al_2O_3$, $HfO_2$, $ZrO_2$, or $SiO_2$.

5. The optical device of claim 1,
wherein the nanopattern layer has a multi-layered structure.

6. The optical device of claim 5, wherein
the multi-layered structure includes,
the nanopattern layer, and
a second nanopattern layer, and
a bottom surface of the second nanopattern layer is coplanar with a top surface of the nanopattern layer.

7. The optical device of claim 6, wherein the second nanopattern layer includes,
a second high refractive index pattern, and
a second low refractive index pattern.

8. The optical device of claim 7, wherein a bottom surface of the second high refractive index pattern contacts a top surface of the high refractive index pattern.

9. The optical device of claim 7, wherein the second high refractive index pattern vertically overlaps the low refractive index pattern between the high refractive index pattern.

10. The optical device of claim 7, wherein the second low refractive index pattern is vertically offset from the low refractive index pattern.

11. The optical device of claim 7, wherein the second low refractive index pattern defines a plurality of nanoholes.

12. The optical device of claim 7, wherein the second low refractive index pattern does not vertically overlap the low refractive index pattern.

13. The optical device of claim 1, wherein the low refractive index pattern includes at least one of $SiO_2$, $MgF_2$, or $Si_3N_4$.

14. The optical device of claim 1, wherein a difference between the refractive index of the high refractive index pattern and the low refractive index pattern is greater than or equal to 1.

15. The optical device of claim 14, wherein the difference between the refractive index of the high refractive index pattern and the low refractive index pattern is greater than or equal to 2.5.

16. The optical device of claim 1, wherein the nanopillars have a width ranging from 10 nm to 500 nm.

* * * * *